United States Patent
Lee

(10) Patent No.: US 11,036,632 B2
(45) Date of Patent: Jun. 15, 2021

(54) MEMORY CONTROLLER AND OPERATING METHOD THEREOF

(71) Applicant: SK hynix Inc., Gyeonggi-do (KR)

(72) Inventor: Seok Jun Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 9 days.

(21) Appl. No.: 16/736,985

(22) Filed: Jan. 8, 2020

(65) Prior Publication Data

US 2021/0042225 A1 Feb. 11, 2021

(30) Foreign Application Priority Data

Aug. 9, 2019 (KR) .................. 10-2019-0097809

(51) Int. Cl.
*G06F 12/06* (2006.01)
*G06F 12/0804* (2016.01)
*G06F 12/02* (2006.01)

(52) U.S. Cl.
CPC ...... *G06F 12/0607* (2013.01); *G06F 12/0246* (2013.01); *G06F 12/0804* (2013.01); *G06F 2212/2022* (2013.01)

(58) Field of Classification Search
None
See application file for complete search history.

(56) References Cited

U.S. PATENT DOCUMENTS

| | | | | |
|---|---|---|---|---|
| 8,976,609 | B1* | 3/2015 | Frayer | G11C 29/04 365/201 |
| 9,092,362 | B1* | 7/2015 | Alcantara | G06F 11/10 |
| 2015/0261797 | A1* | 9/2015 | Alcantara | G06F 3/064 707/813 |
| 2015/0364218 | A1* | 12/2015 | Frayer | G06F 12/0246 714/6.13 |
| 2018/0129430 | A1* | 5/2018 | Kang | G06F 11/1044 |

FOREIGN PATENT DOCUMENTS

| | | |
|---|---|---|
| KR | 10-1942272 | 1/2019 |
| KR | 10-1969883 | 4/2019 |

* cited by examiner

*Primary Examiner* — Kevin Verbrugge
(74) *Attorney, Agent, or Firm* — IP & T Group LLP

(57) ABSTRACT

The present disclosure relates to an electronic device. A memory controller having improved read interleaving and write interleaving performance may include a buffer memory temporarily storing data chunks read from a sacrificial area, a target die information manager generating target die information on a plurality of memory dies in which the data chunks are respectively stored according to logical address counts of the data chunks corresponding to the plurality of memory dies, respectively, determined based on correspondence information between the plurality of memory dies and logical addresses provided from a host, and a write operation controller controlling the plurality of memory dies so that the data chunks temporarily stored in the buffer memory are stored in the plurality of memory dies on the basis of the target die information.

16 Claims, 18 Drawing Sheets

FIG. 5

| LOGICAL ADDRESS | DIE |
|---|---|
| LA 0 | DIE 0 |
| LA 1 | DIE 1 |
| LA 2 | DIE 2 |
| LA 3 | DIE 3 |
| LA 4 | DIE 0 |
| LA 5 | DIE 1 |
| LA 6 | DIE 2 |
| LA 7 | DIE 3 |
| LA 8 | DIE 0 |
| LA 9 | DIE 1 |
| LA 10 | DIE 2 |
| LA 11 | DIE 3 |
| LA 12 | DIE 0 |
| LA 13 | DIE 1 |
| LA 14 | DIE 2 |
| LA 15 | DIE 3 |
| ⋮ | ⋮ |

500

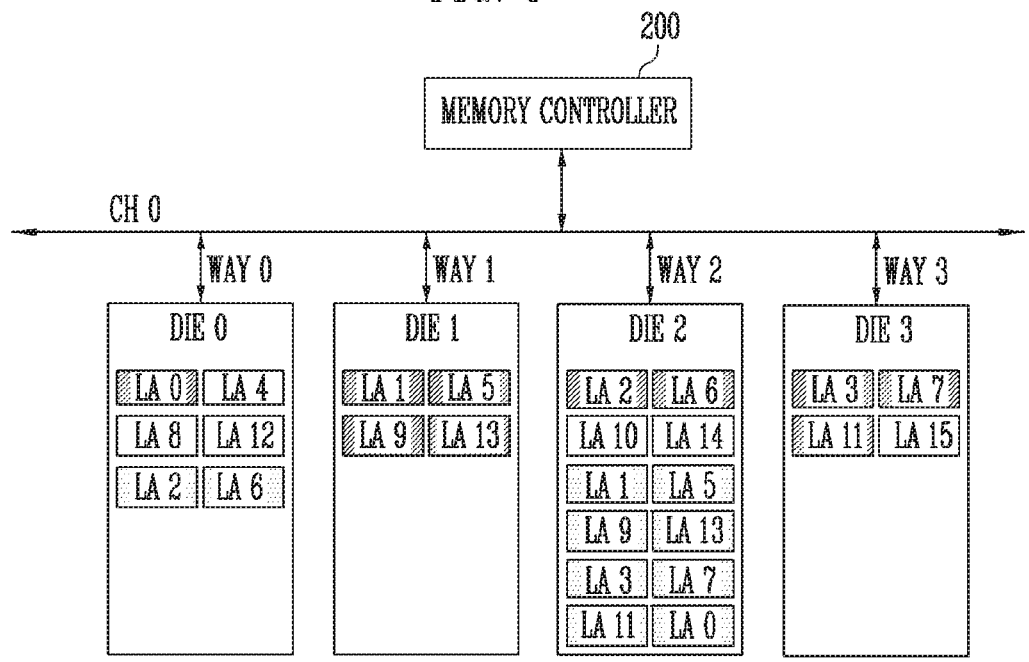
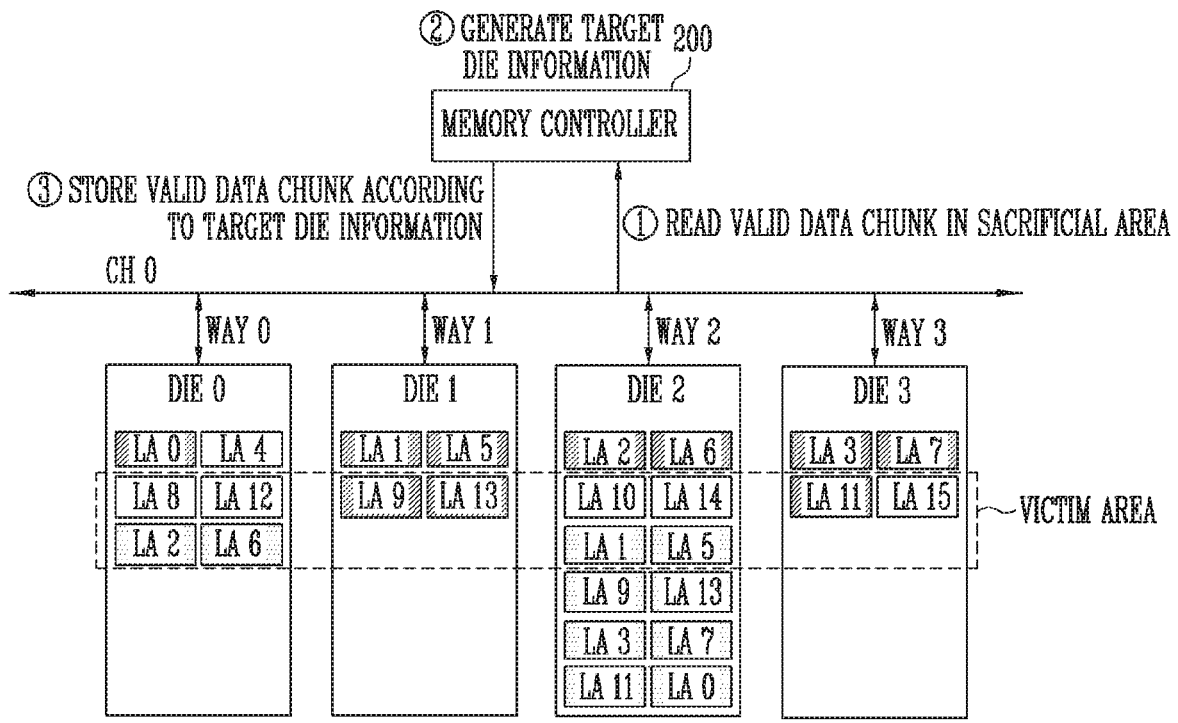

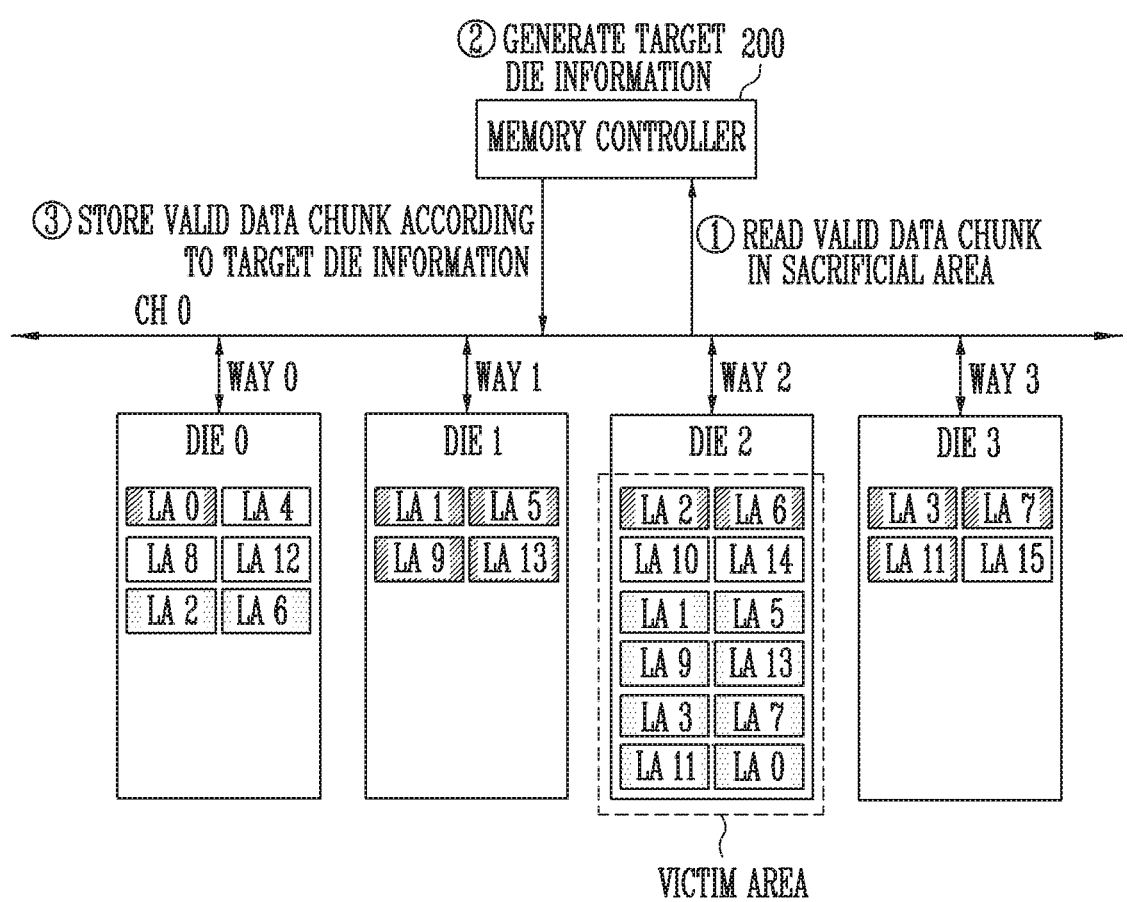

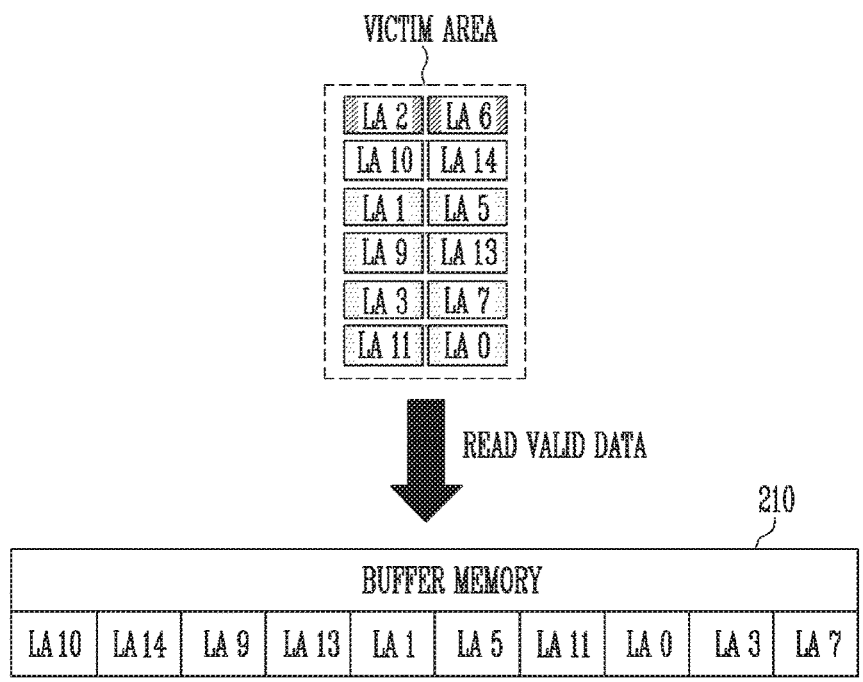
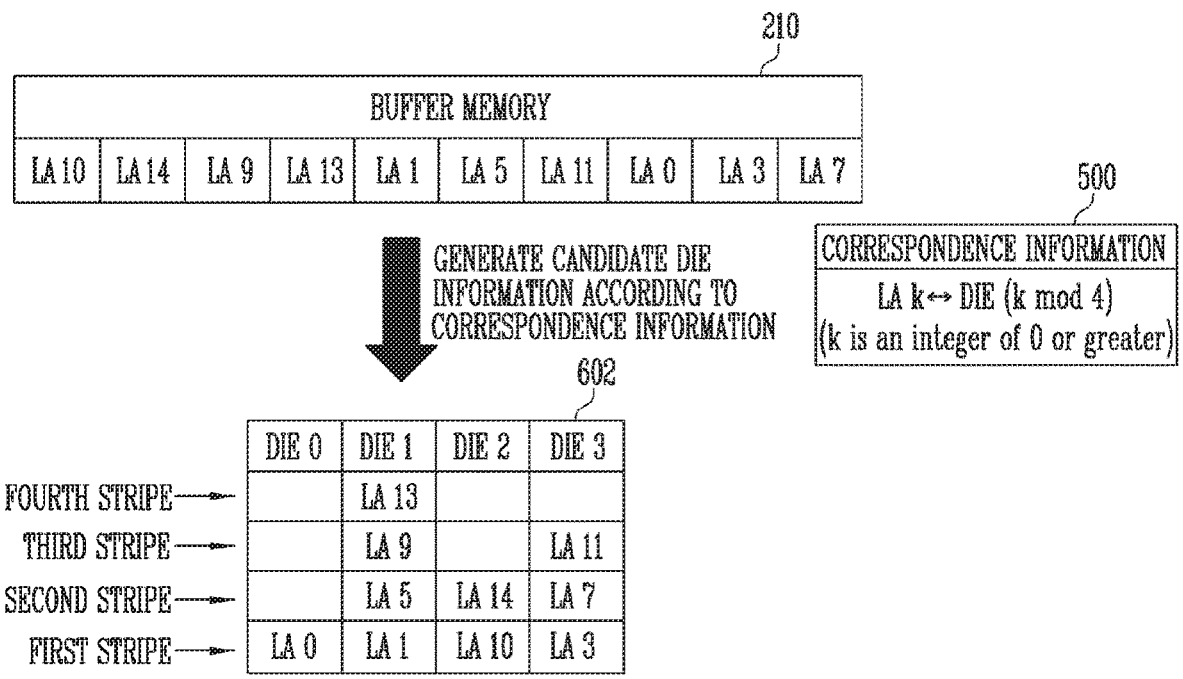

MEMORY CONTROLLER AND OPERATING METHOD THEREOF

CROSS-REFERENCE TO RELATED APPLICATION

The present application claims priority under 35 U.S.C. § 119(a) to Korean patent application number 10-2019-0097809, filed on Aug. 9, 2019, which is incorporated herein by reference in its entirety.

BACKGROUND

Field of Invention

Various embodiments of the present disclosure relate generally to an electronic device, and more particularly, to a memory controller and a method of operating the electronic device.

Description of Related Art

A storage device may store data in response to control of a host device such as a computer or a smartphone. The storage device may include a memory device storing data and a memory controller controlling the memory device. Generally, there are two types of memory devices: volatile memory devices and non-volatile memory devices.

A volatile memory device may retain data as long as power is being supplied, and may lose the stored data in the absence of power supply. Types of volatile memory devices include Static Random Access Memory (SRAM), Dynamic Random Access Memory (DRAM), and the like.

A non-volatile memory device may retain data even in the absence of power supply. Types of non-volatile memory devices include Read Only Memory (ROM), Programmable ROM (PROM), Electrically Programmable ROM (EPROM), Electrically Erasable and Programmable ROM (EEPROM) and flash memory.

SUMMARY

Various embodiments are directed to a memory controller having improved read interleaving performance and write interleaving performance and a method of operating the same.

According to an embodiment, a memory controller migrating data chunks from a victim area in at least one memory die, among a plurality of memory dies, to a target area different from the victim area may include a buffer memory temporarily storing the data chunks read from the victim area, a target die information manager generating target die information on the plurality of memory dies, to which the data chunks are to be migrated respectively, according to logical address counts of the data chunks, the logical address counts being determined based on correspondence information between the plurality of memory dies and logical addresses corresponding to the data chunk, and a write operation controller controlling the plurality of memory dies so that the data chunks temporarily stored in the buffer memory are stored in the plurality of memory dies according to the target die information.

According to an embodiment, a storage device may include a plurality of memory dies, a buffer memory temporarily storing a plurality of data chunks stored in a victim area in at least one memory die among the plurality of memory dies, and a memory controller controlling the plurality of memory dies so that the plurality of data chunks are mapped to the plurality of memory dies to form a plurality of data chunk groups respectively corresponding to the plurality of memory dies, a data chunk included in at least one data chunk group is remapped to be included in another data chunk group on the basis of a number of data chunks included in each of the plurality of data chunk groups, and a set of data chunks, one is selected from each of the plurality of data chunk groups, is stored in the plurality of memory dies.

According to an embodiment, a method of migrating data chunks stored in a victim area included in at least one memory die among a plurality of memory dies to a target area different from the victim area may include reading the data chunks from the victim area, counting logical addresses to determine a number of logical addresses corresponding to the data chunks to be migrated into each of the plurality of memory dies on the basis of correspondence information between the plurality of memory dies and the logical addresses, generating target die information about the plurality of memory dies in which the data chunks are to be migrated respectively on the basis of the logical address counts respectively corresponding to the memory dies, and controlling the plurality of memory dies so that the data chunks read from the victim area are stored in the plurality of memory dies according to an interleaving scheme on the basis of the target die information.

Furthermore, the generating of the target die information comprises, generating candidate die information about the plurality of memory dies respectively corresponding to the data chunks on the basis of the correspondence information, and generating the target die information on the basis of the logical address count and the candidate die information.

Furthermore, in the generating of the target die information, the candidate die information is used as the target die information when a difference of logical address counts between any two of the plurality of memory dies is one or less.

Furthermore, the generating of the target die information comprises, generating the target die information to change a migration destination of one or more data chunks from a first memory die corresponding to the greatest logical address count to a second memory die.

Furthermore, the generating of the target die information comprises, generating the target die information to change a migration destination of one or more valid data chunks from a third memory die to be migrated to a second memory die corresponding to the smallest logical address count.

Furthermore, the generating of the target die information comprises, generating the target die information to reduce a difference of logical address counts between any two of the plurality of memory dies to one or less when the difference exceeds one.

BRIEF DESCRIPTION OF THE DRAWINGS

FIG. 5 is a diagram illustrating correspondence information between a logical address and a memory die to improve read interleaving speed.

FIG. 8 is a diagram illustrating a situation in which mapping relationships between memory areas and logical addresses has changed.

FIG. 9 is a diagram illustrating a data migration operation according to an embodiment of the present disclosure.

FIG. 10 is a diagram illustrating a data migration operation according to another embodiment of the present disclosure.

FIG. 11 is a diagram illustrating a read process of a valid data chunk according to an embodiment of the present disclosure.

FIG. 12 is a diagram illustrating a process of generating candidate die information according to an embodiment of the present disclosure.

DETAILED DESCRIPTION

Specific structural and functional description is provided to describe embodiments. However, the present invention may embodied in various other forms and configurations and may be carried out in various different ways. Thus, the invention is not limited to any particular embodiment nor to any specific detail.

Throughout the specification, reference to "an embodiment," "another embodiment" or the like is not necessarily to only one embodiment, and different references to any such phrase is not necessarily to the same embodiment(s). Moreover, an element referred to in the singular does not necessarily mean only one such element. Similarly, the indefinite articles "a" and "an" generally mean one or more, unless stated or the context requires only one.

Hereinafter, embodiments of the present disclosure are described in detail with reference to the accompanying drawings in order for those skilled in the art to be able to readily implement and practice the invention.

Figure 1:
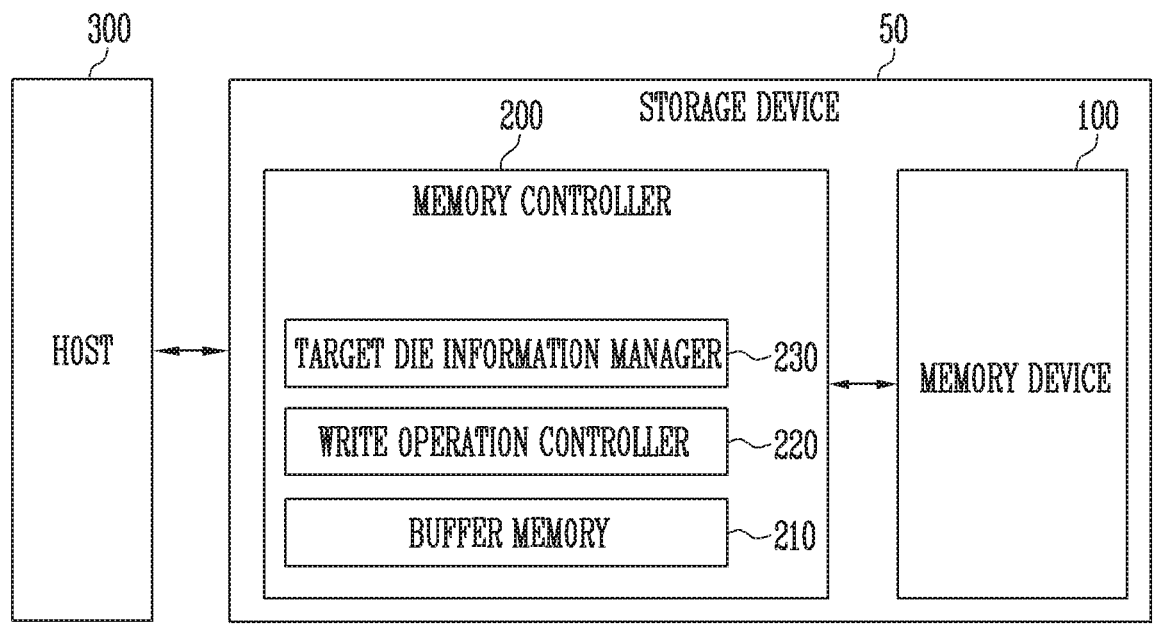
FIG. 1 is a block diagram illustrating a storage device.

FIG. 1 is a block diagram illustrating a storage device 50.

Referring to FIG. 1, the storage device 50 may include a memory device 100 and a memory controller 200 controlling operations of the memory device 100.

The storage device 50 may be configured to store data in response to control of a host 300. Examples of the storage device 50 may include a cellular phone, a smartphone, an MP3 player, a laptop computer, a desktop computer, a game player, a TV, a tablet PC, or an in-vehicle infotainment system.

The storage device 50 may be configured as any of various types of storage devices according to a host interface corresponding to a communication method with the host 300. For example, the storage device 50 may be configured as a solid state drive (SSD), a multimedia card in the form of an MMC, an eMMC, an RS-MMC and a micro-MMC, a secure digital card in the form of an SD, a mini-SD and a micro-SD, a universal serial bus (USB) storage device, a universal flash storage (UFS) device, a Personal Computer Memory Card International Association (PCMCIA) card type storage device, a peripheral component interconnection (PCI) card type storage device, a PCI express (PCI-E) card type storage device, a compact flash (CF) card, a smart media card, and/or a memory stick.

The storage device 50 may be manufactured as any of various types of packages. For example, the storage device 50 may be manufactured as a package-on-package (POP), a system in-package (SIP), a system-on-chip (SOC), a multi-chip package (MCP), a chip-on-board (COB), a wafer-level fabricated package (WFP), and/or a wafer-level stack package (WSP).

The memory device 100 may store data. The memory device 100 may operate in response to control of the memory controller 200. The memory device 100 may include a plurality of memory dies. Each of the memory dies may include a memory cell array including a plurality of memory cells storing data.

Each of the memory cells may be a single level cell (SLC) for storing one data bit, a multi-level cell (MLC) for storing two data bits, a triple level cell (TLC) for storing three data bits, or a quad level cell (QLC) for storing four data bits.

The memory cell array may include a plurality of memory blocks. Each of the memory blocks may include a plurality of memory cells. Each memory block may include a plurality of pages. According to an embodiment, a page may be a unit for storing data in the memory device 100 or reading stored data stored from the memory device 100. The memory block may be a unit for erasing data.

In an embodiment, the memory device 100 may be a Double Data Rate Synchronous Dynamic Random Access Memory (DDR SDRAM), a Low Power Double Data Rate4 (LPDDR4) SDRAM, a Graphics Double Data Rate (GDDR) SDRAM, a Low Power DDR (LPDDR) SDRAM, a Rambus Dynamic Random Access Memory (RDRAM), a NAND flash memory, a vertical NAND flash memory, a NOR flash memory device, a resistive random access memory (RRAM), a phase-change memory (PRAM), a magnetoresistive random access memory (MRAM), a ferroelectric random access memory (FRAM), or a spin transfer torque random access memory (STT-RAM). The present invention is described in the context in which the memory device 100 is a NAND flash memory.

The memory device 100 may receive a command and an address from the memory controller 200. The memory device 100 may be configured to access a selected area in the memory cell array in response to the received address. When the memory device 100 accesses the selected area, it may mean that the memory device 100 may perform an operation corresponding to the received command on the area selected by the address. For example, the memory device 100 may perform a write operation (program operation), a read operation, and an erase operation. During a program operation, the memory device 100 may program the area selected by the address with data. During a read operation, the memory device 100 may read data from the area selected by the address. During an erase operation, the memory device 100 may erase data from the area selected by the address.

The memory device 100 may include a plurality of memory dies. Each of the memory dies may include at least one memory cell array. The plurality of memory dies may be controlled by a die interleaving operation, a channel interleaving operation, a way interleaving operation, or a plane interleaving operation.

When power is applied to the storage device 50, the memory controller 200 may execute firmware FW. The firmware FW may include a host interface layer HIL, a flash translation layer FTL and a flash interface layer FIL. The host interface layer HIL may receive a request input from the host 300 or outputting a response to the host 300. The flash translation layer FTL may manage operations between an interface of the host 300 and an interface of the memory device 100. The flash interface layer FIL may provide a command to the memory device 100 or receive a response from the memory device 100.

The memory controller 200 may receive data and a logical address LA from the host 300 and convert the logical address LA into a physical address PA indicating an address of memory cells where the data is stored in the memory device 100. The logical address may be a logical block address LBA and the physical address may be a physical block address PBA.

For example, the memory controller 200 may control the memory device 100 so that a program operation, a read operation or an erase operation may be performed in response to a request from the host 300. During a program operation, the memory controller 200 may provide a program command, a physical block address, and data to the memory device 100. During a read operation, the memory controller 200 may provide a read command and a physical block address to the memory device 100. During an erase operation, the memory controller 200 may provide an erase command, a physical block address, and data to the memory device 100.

Alternatively, the memory controller 200 may control the memory device 100 so that a program operation, a read operation or an erase operation may be performed even in the absence of a request from the host 300. The memory controller 200 may control the memory device 100 to perform background operations such as wear leveling, garbage collection and read reclaim.

According to an embodiment of the present disclosure, the memory controller 200 may perform a migration operation of moving a valid data chunk from a victim area to a target area. Background operations including wear leveling, garbage collection and read reclaim may include a migration operation. The victim area may refer to an area where data chunks to be migrated are stored. The memory controller 200 may select the victim area based on the number of valid data chunks stored in the area, which may be a memory block. For example, the memory controller 200 may select a memory block with the fewest valid data chunks as a victim area. The memory controller 200 may select the victim area on the basis of the number of times data from a given area. For example, the memory controller 200 may select a memory block with the largest number of reads as the victim area. The memory controller 200 may select the victim area on the basis of the number of times data in a given area has been erased. For example, the memory controller 200 may select a memory block with the largest number of erases as the victim area.

According to an embodiment of the present disclosure, the memory controller 200 may include a buffer memory 210, a write operation controller 220, and a target die information manager 230 to perform a migration operation.

The buffer memory 210 may include a read buffer temporarily storing a data chunk read from the memory device 100 and a write buffer temporarily storing a data chunk to program. As illustrated in FIG. 1, the buffer memory 210 may be located in the memory controller 200. However, the buffer memory 210 may be located outside the memory controller 200.

The write operation controller 220 may control the buffer memory 210 and the memory device 100 so that data chunks temporarily stored in the buffer memory 210 may be programmed into the memory device 100. The write operation controller 220 may receive target die information from the target die information manager 230, and distribute and store the data chunks temporarily stored in the buffer memory 210 in the plurality of memory dies in the memory device 100 on the basis of the target die information.

The target die information manager 230 may generate the target die information about each of the memory dies in which each of the data chunks is stored. The target die information may be generated in consideration of write time when the data chunks stored in the victim area are distributed and stored in the plurality of memory dies and read time when the data chunks distributed and stored in the plurality of memory dies are read.

The host 300 may communicate with the storage device 50 using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and/or Load Reduced DIMM (LRDIMM) communication methods.

Figure 2:
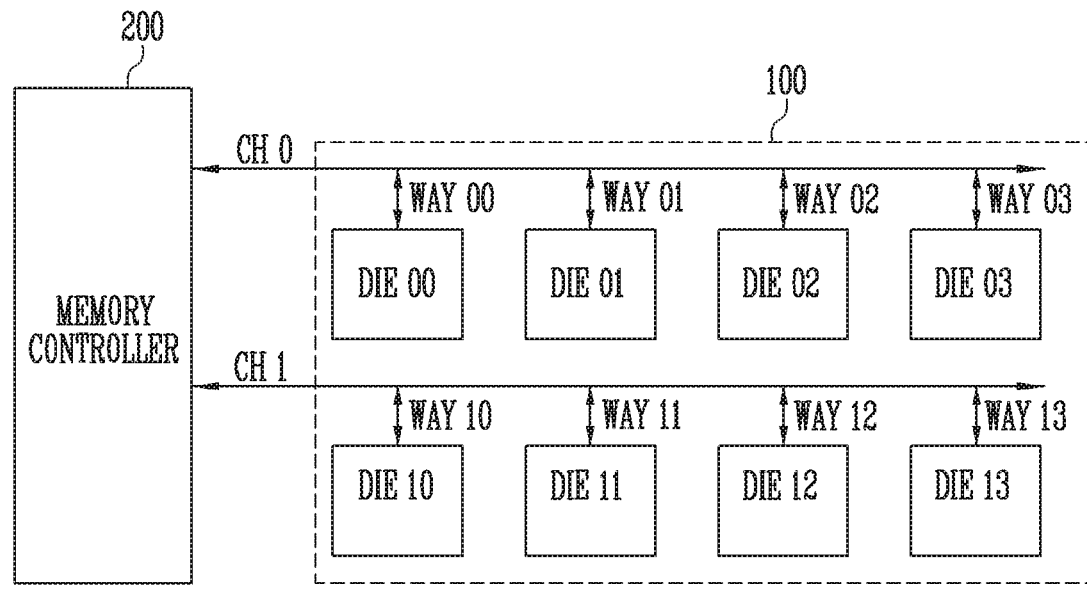
FIG. 2 is a diagram illustrating operations of a memory controller controlling a plurality of memory dies.

FIG. 2 is a diagram illustrating operations of the memory controller 200 controlling a plurality of memory dies.

Referring to FIG. 2, the memory device 100 may include a plurality of memory dies DIE 00 to DIE 13. The memory controller 200 may be coupled to the plurality of memory dies DIE 0 to DIE 13 through a zeroth channel CH 0 and a first channel CH 1. However, the number of channels and the number of memory dies coupled to each channel are not limited to any particular numbers. Any suitable configuration consistent with the teachings herein may be used.

The memory die 00 (DIE 00), the memory die 01 (DIE 01), the memory die 02 (DIE 02) and the memory die 03 (DIE 03) may be coupled in common to the zeroth channel CH 0. The memory die 00, the memory die 01, the memory die 02 and the memory die 03 may communicate with the memory controller 200 through the zeroth channel CH 0.

Since the memory die 00, the memory die 01, the memory die 02 and the memory die 03 are commonly coupled to the zeroth channel CH 0, only one such memory die may communicate with the memory controller 200 at a time. On other hand, internal operations of the memory die 00, the memory die 01, the memory die 02 and the memory die 03 may be performed at the same time.

The memory die 10 (DIE 10), the memory die 11 (DIE 11), the memory die 12 (DIE 12) and the memory die 13 (DIE 13) may be coupled in common to the first channel CH 1. The memory die 10, the memory die 11, the memory die 12 and the memory die 13 may communicate with the memory controller 200 through the first channel CH 1.

Since the memory die 10, the memory die 11, the memory die 12 and the memory die 13 are commonly coupled to the first channel CH 1, only one such memory die may communicate with the memory controller 200 at a time. On other hand, internal operations of the memory die 10, the memory die 11, the memory die 12 and the memory die 13 may be performed at the same time.

The memory device 100 including the plurality of memory dies DIE 00 to DIE 13 may exchange data with the memory controller 200 in accordance with an interleaving scheme.

According to an interleaving scheme, input and output operations on memory dies coupled to a particular way may be sequentially performed, and internal operations of the respective memory dies may overlap for a period of time. The interleaving scheme may be one of the schemes by which the respective memory dies are accessed in parallel. The memory controller 200 may transfer a program command, an address and data to the memory die 00 through the zeroth channel CH 0. When the data transferred to the memory die 00 is programmed into the memory cell array, the memory controller 200 may transfer the program command, the address and the data to the memory die 01. When the data transferred to the memory die 01 is programmed into the memory cell array, the memory controller 200 may transfer the program command, the address and the data to the memory die 02. In the same manner, the memory controller 200 may program the memory die 03 to the memory die 13 with data.

The memory controller 200 may distribute and allocate sequential logical addresses to a plurality of ways (WAY 00 to WAY 13) to access the memory dies coupled to the channels in a parallel manner in accordance with the interleaving scheme.

In FIG. 2, the plurality of memory dies of a particular channel may be coupled to four ways. For example, memory die 00 (DIE 00) to memory die 03 (DIE 03) may be coupled to way 00 (WAY 00) to way 03 (WAY 03), respectively. Memory die 10 (DIE 10) to memory die 13 (DIE 13) may be coupled to way 10 (WAY 10) to way 13 (WAY 13), respectively. Each of the channels CH 0 and CH 1 may be a bus of signals shared between memory dies coupled to each channel.

Interleaving for the two channel our way configuration is described with reference to FIG. 2. However, numbers of channels and ways are not limited thereto.

Figure 3:
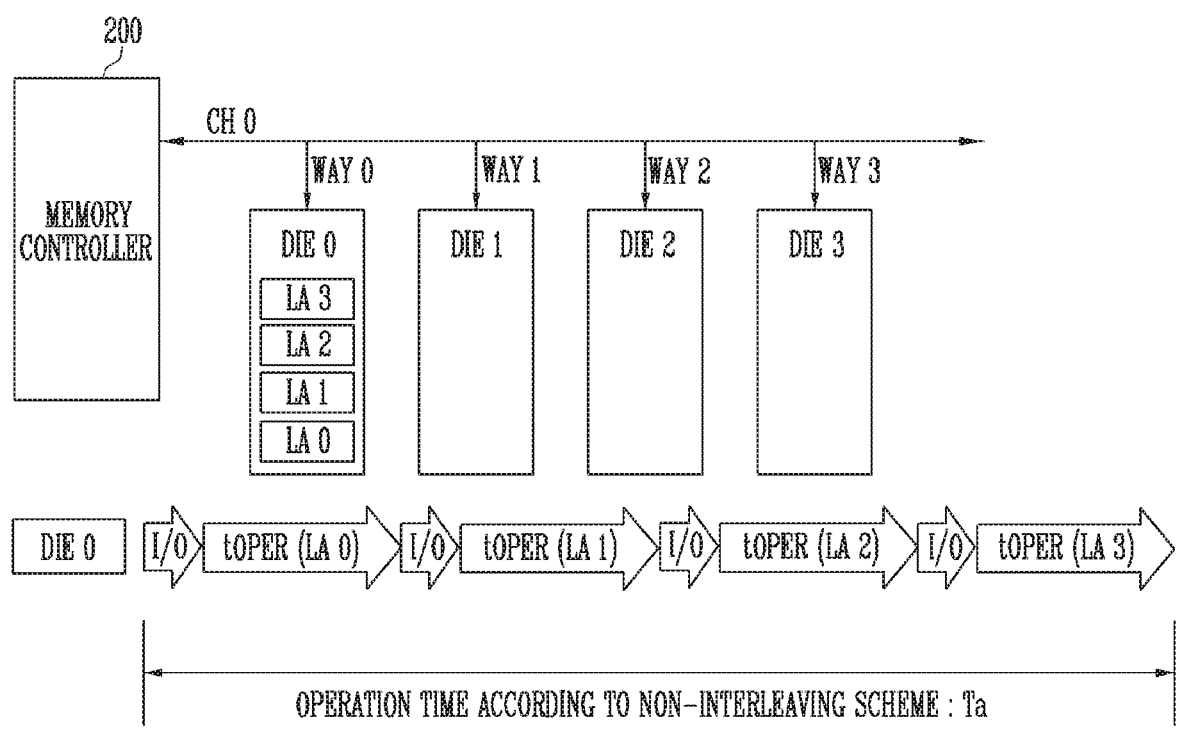
FIG. 3 is a diagram illustrating an operation time according to a non-interleaving scheme.

FIG. 3 is a diagram illustrating an operation time according to a non-interleaving scheme.

Referring to FIG. 3, the memory controller 200 may control a plurality of memory dies 0 to 3 (DIE 0 to DIE 3) so that operations may be performed on data chunks corresponding to logical addresses 0 to 3 (LA 0 to LA 3) according to a non-interleaving scheme.

According to a non-interleaving scheme, data chunks stored in one memory die may be read, or data chunks may be programmed into one memory die. For example, the memory controller 200 may control the plurality of memory dies so that the data chunks corresponding to the logical addresses 0 to 3 (LA 0 to LA 3) may be programmed into the memory die 0 (DIE 0) according to the non-interleaving scheme. The memory controller 200 may control the plurality of memory dies so that the data chunks corresponding to the logical addresses 0 to 3 (LA 0 to LA 3) and stored in the memory die 0 (DIE 0) may be read according to the non-interleaving scheme. Hereinafter, a write operation is described as an example.

To program the data chunk corresponding to the logical address 0 (LA 0) into the memory die 0 (DIE 0), the memory controller 200 may transfer a program command, a physical address and the data chunk to the memory die 0 (DIE 0) through an input/output interface I/O. The operation of transferring the program command, the physical address and the data chunk through the input/output interface may include an operation of transferring the program command, the physical address and the data chunk through the zeroth channel 0 (CH 0) and the way 0 (WAY 0). The data chunk transferred to the memory die 0 (DIE 0) may be programmed into the memory cell array during a program time tOPER.

When the data chunk corresponding to the logical address 0 (LA 0) is completely programmed into the memory cell array, the memory controller 200 may transfer the program command, the physical address and the data chunk to the memory die 0 (DIE 0) through the input/output interface I/O to program the data chunk corresponding to the logical address 1 (LA 1). The transferred data chunk may be programmed into the memory cell array in the memory die 0 (DIE 0) during the program time tOPER. In the same manner, the data chunks corresponding to the logical addresses 2 and 3 (LA 2 and LA 3) may be sequentially programmed into the memory die 0 (DIE 0).

According to an embodiment, the memory controller 200 may transfer the data chunks corresponding to the logical addresses 0 to 3 (LA 0 to LA 3) to the memory die 0 (DIE 0) one at a time. More specifically, the data chunks corresponding to the logical addresses 0 to 3 (LA 0 to LA 3) may be transferred to a cache buffer in the memory die 0 (DIE 0) one at a time. The data chunks corresponding to the logical addresses 0 to 3 (LA 0 to LA 3) transferred to the memory die 0 (DIE 0) may be sequentially programmed into a memory cell according to a cache program scheme.

It may be assumed that a page buffer in the memory die has the same size as a data chunk corresponding to a logical address. For example, the page buffer in the memory die and the data chunk each may have a size of 4 kB. The size of the page buffer may be the size of data for program and read operations. Therefore, one data chunk may be programmed at a time into the memory cell array included in the memory die.

The data chunks corresponding to the logical addresses 0 to 3 (LA 0 to LA 3) may be programmed into the memory die 0 (DIE 0) according to the non-interleaving scheme during a program operation time (Ta).

Figure 4:
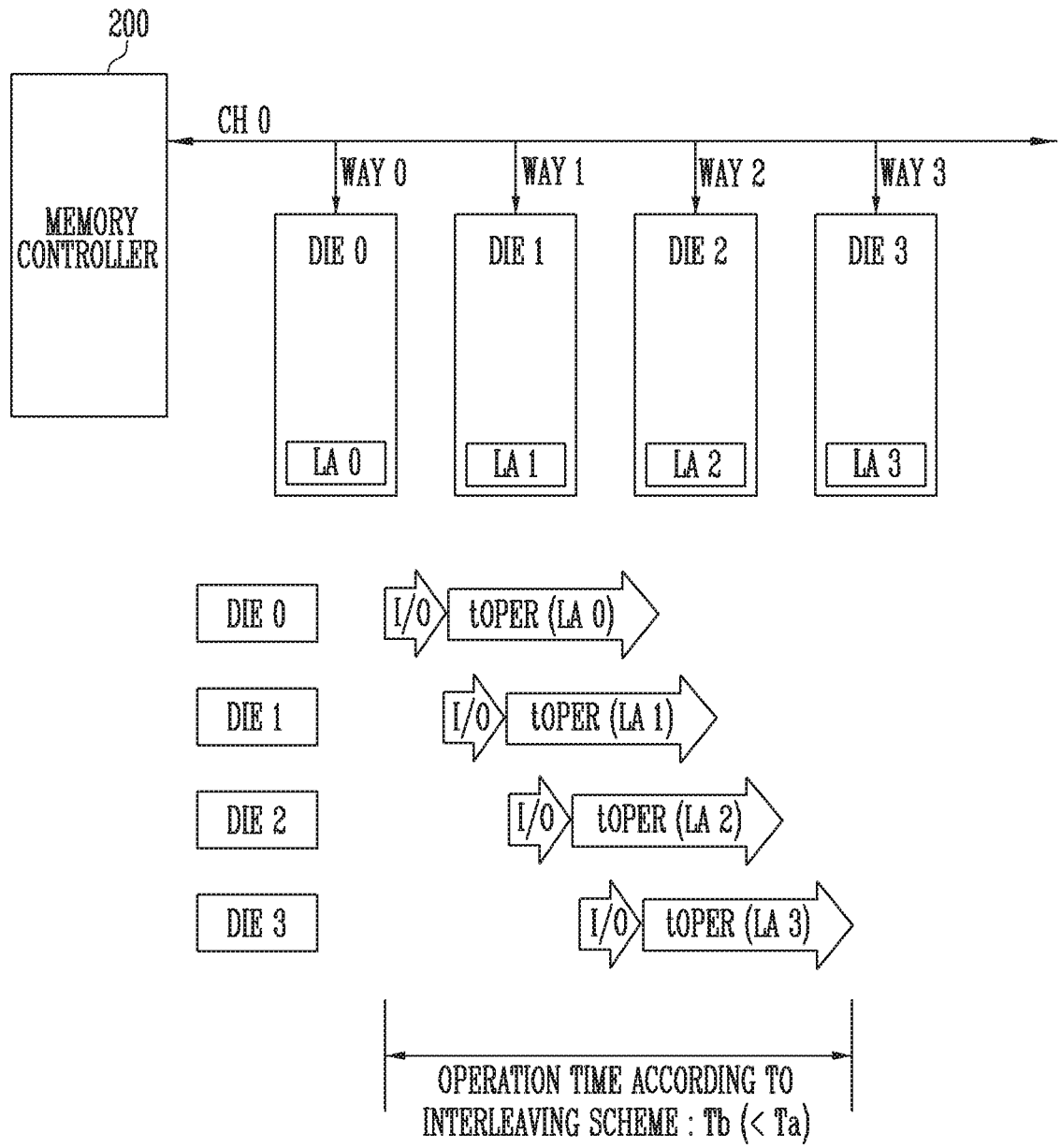
FIG. 4 is a diagram illustrating an operation time according to an interleaving scheme.

FIG. 4 is a diagram illustrating an operation time according to an interleaving scheme.

Referring to FIG. 4, the memory controller 200 may control the plurality of memory dies so that operations may be performed on the data chunks corresponding to the logical addresses 0 to 3 (LA 0 to LA 3) according to an interleaving scheme. According to the interleaving scheme, input and output operations on memory dies coupled to different ways may be sequentially performed, and such internal operations may be performed in at least partially overlapping time periods.

For example, the memory controller 200 may control the plurality of memory dies so that the data chunks corresponding to the logical addresses 0 to 3 (LA 0 to LA 3) may be programmed into the plurality of memory dies 0 to 3 (DIE 0 to DIE 3) according to the interleaving scheme. The memory controller 200 may control the plurality of memory dies so that the data chunks corresponding to the logical addresses 0 to 3 (LA 0 to LA 3) and stored in the memory die 0 (DIE 0) may be read by the interleaving scheme. Hereinafter, a program operation is described as an example.

To program the data chunk corresponding to the logical address 0 (LA 0) into the memory die 0 (DIE 0), the memory controller 200 may transfer a program command, a physical address and the data chunk to the memory die 0 (DIE 0) through the zeroth channel 0 (CH 0) and the way 0 (WAY 0). The transferred data chunk may be programmed into the memory cell array in the memory die 0 (DIE 0) during the program time (tOPER).

When the data chunk corresponding to the logical address 0 (LA 0) is being programmed into the memory cell array, the memory controller 200 may transfer the program command, the physical address and the data chunk to the memory die 1 (DIE 1) through the zeroth channel 0 (CH 0) and the way 0 (WAY 0) to program the data chunk corresponding to the logical address 1 (LA 1). The transferred data chunk may be programmed into the memory cell array in the memory die 1 (DIE 1) during the program time (tOPER). In the same manner, the data chunks corresponding to the logical addresses 2 and 3 (LA 2 and LA 3) may be programmed into the memory die 2 (DIE 2) and the memory die 3 (DIE 3), respectively.

The total time for programming the data chunks corresponding to the logical addresses 0 to 3 (LA 0 to LA 3) into the memory dies 0 to 3 (DIE 0 to DIE 3) in the interleaving scheme is Tb, which is the program operation time.

According to the interleaving scheme, while the data chunk is programmed into the memory cell array, the program command, the physical address and the data chunk may be transferred to another memory die through the channel 0 CH 0. Therefore, the program operation time Tb according to the interleaving scheme may be shorter than the program operation time Ta according to the non-interleaving scheme.

FIG. 5 is a diagram illustrating correspondence information between a logical address and a memory die to increase read interleaving speed.

Referring to FIG. 5, correspondence information 500 may indicate the relationship between logical addresses and memory dies. The correspondence information 500 may be determined to enable a read interleaving operation to be performed on sequential logical addresses. For example, the logical addresses 0 to 3 (LA 0 to LA 3) may correspond to the memory dies 0 to 3 (DIE 0 to DIE 3), respectively, and logical addresses 4 to 7 (LA 4 to LA 7) may correspond to the memory dies 0 to 3 (DIE 0 to DIE 3), respectively. Logical addresses 8 to 11 (LA 8 to LA 11) may correspond to the memory dies 0 to 3 (DIE 0 to DIE 3), respectively, and logical addresses 12 to 15 (LA 12 to LA 15) may correspond to the memory dies 0 to 3 (DIE 0 to DIE 3), respectively.

As described above with reference to FIG. 3, when data chunks corresponding to sequential logical addresses are distributed and stored in the plurality of memory dies, the memory controller 200 may read the data chunks corresponding to the sequential logical addresses according to an interleaving method. In other words, while a data chunk is being read in a memory cell array, a read command and an address may be transferred to another memory die. As a result, read speed may be increased.

Figure 6:
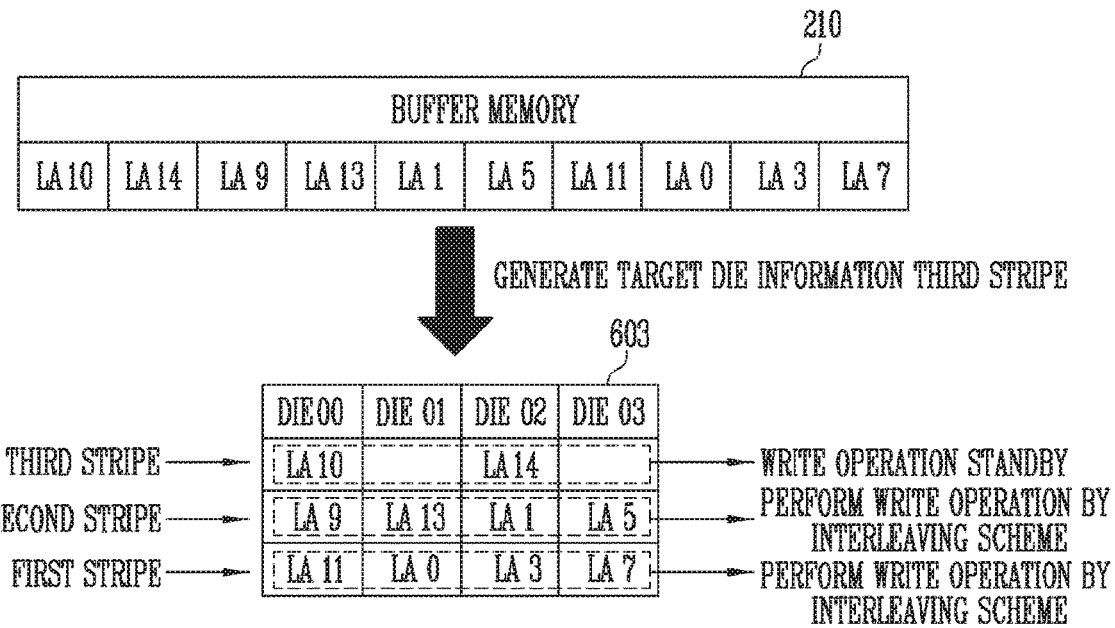
FIG. 6 is a diagram illustrating a write interleaving scheme.

FIG. 6 is a diagram illustrating a write interleaving scheme.

Referring to FIG. 6, the memory controller 200 may control the memory device 100 to perform a write operation by which data chunks temporarily stored in the buffer memory 210 are programmed into the memory device 100. The memory controller 200 may generate target die information 603 before the write operation is performed. More specifically, the memory controller 200 may control the buffer memory 210 and the memory device 100 to generate the target die information 603 indicating memory dies in which the data chunks are to be respectively stored, and to perform a write operation according to the target die information 603.

For example, the memory controller 200 may generate the target die information 603 so that the data chunks corresponding to the logical addresses 11, 9, and 10 (LA 11, LA 9, and LA 10) may be stored in the memory die 00 (DIE 00). For example, the memory controller 200 may generate the target die information 603 so that the data chunks corresponding to the logical addresses 0 and 13 (LA 0 and LA 13) may be stored in the memory die 01 (DIE 01). For example, the memory controller 200 may generate the target die information 603 so that the data chunks corresponding to the logical addresses 3, 1, and 14 (LA 3, LA 1, and LA 14) may be stored in the memory die 02 (DIE 02). The memory controller 200 may generate the target die information 603 so that the data chunks corresponding to the logical addresses 7 and 5 (LA 7 and LA 5) may be stored in the memory die 03 (DIE 03).

The target die information 603 may include stripe information indicating each of a plurality of stripes. For example, the target die information 603 may include first to third stripe information respectively indicating first to third stripes. A stripe may be a group of memory areas (e.g., pages) selected from respective memory dies coupled to a single channel. A stripe may include a memory area allocated within each of the memory dies coupled to a signal channel. For example, a plurality of memory blocks respectively selected from the plurality of memory dies may configure a single super block. Within the super block, pages of the same location in the respective memory blocks may configure a single stripe. The stripe information may have a format of logical addresses representing a set of data chunks to be stored in a single stripe through a single write operation according to an interleaving scheme. An interleaving operation may be a single read or write operation according and may be performed in units of stripes. When a single piece of the stripe information becomes full of entries (i.e., when a single piece of stripe information indicates a complete set of data chunks to be migrated into a stripe of the target memory dies), the memory controller 200 may control a plurality of memory dies to perform a write operation on the corresponding stripe according to the interleaving scheme.

For example, the memory controller 200 may control the buffer memory 210 and the plurality of memory dies to perform a write operation on the first stripe including valid data chunks corresponding to the logical addresses 11, 0, 3, and 7 (LA 11, LA 0, LA 3, and LA 7) according to an interleaving scheme. The data chunks corresponding to the logical addresses 11, 0, 3, and 7 (LA 11, LA 0, LA 3, and LA 7) may be stored in the memory dies 00, 01, 02 and 03 (DIE 00, DIE 01, DIE 02, and DIE 03), respectively. In the same manner, the memory controller 200 may control the buffer memory 210 and the plurality of memory dies to perform a write operation on the second stripe including valid data chunks corresponding to the logical addresses 9, 13, and 5 (LA 9, LA 13, LA 1, and LA 5) according to the interleaving scheme. The data chunks corresponding to the logical addresses 9, 13, and 5 (LA 9, LA 13, LA 1, and LA 5) may be stored in the memory dies 00, 01, 02 and 03 (DIE 00, DIE 01, DIE 02, and DIE 03), respectively.

On the other hand, when a piece of stripe information within the target die information 603 includes an empty entry and thus still has space for another logical address, the memory controller 200 may wait for a reference time for the stripe information to further include a logical address and perform a write operation on a stripe corresponding to the stripe information. In other words, the write operation may be delayed by the reference time. For example, since no memory space is yet allocated from the memory dies 01 and 03 (DIE 01 and DIE 03) in the third stripe due to no data chunk to be migrated into the third stripe, the memory controller 200 may control such that the third stripe within the memory device 100 may wait for the reference time to further include logical addresses for DIE 01 and DIE 03 within the third stripe. In other words, it may be controlled such that a write operation on the third stripe is delayed by the reference time.

When the reference time has passed, the memory controller 200 may control the memory device 100 and the buffer memory 210 so that the data chunks corresponding to the stripe information which is not full, may be stored in the stripe corresponding to the stripe information within the memory device 100. For example, the memory controller 200 may control the buffer memory 210 and the plurality of memory dies so that the valid data chunks corresponding to the logical addresses 10 and 14 (LA 10 and LA 14) of the stripe information corresponding to the third stripe may be stored in the memory dies 00 and 02 (DIE 00 and DIE 02), respectively.

In this example, the memory controller 200 may generate the stripe information (e.g., for the third stripe), an empty entry of which is filled with a logical address for dummy data within the target die information 603, and may control the memory dies DIE 01 and DIE 03 to store the dummy data in memory areas corresponding to the filled logical addresses within the stripe according to the stripe information including the filled logical addresses for the dummy data. In other words, when write interleaving is performed on the third stripe, the valid data chunks corresponding to the logical addresses 10 and 14 (LA 10 and LA 14) may be stored in the memory dies 00 and 02 (DIE 00 and DIE 02), respectively, and the dummy data may be stored in the memory dies 01 and 03 (DIE 01 and DIE 03).

Figure 7:
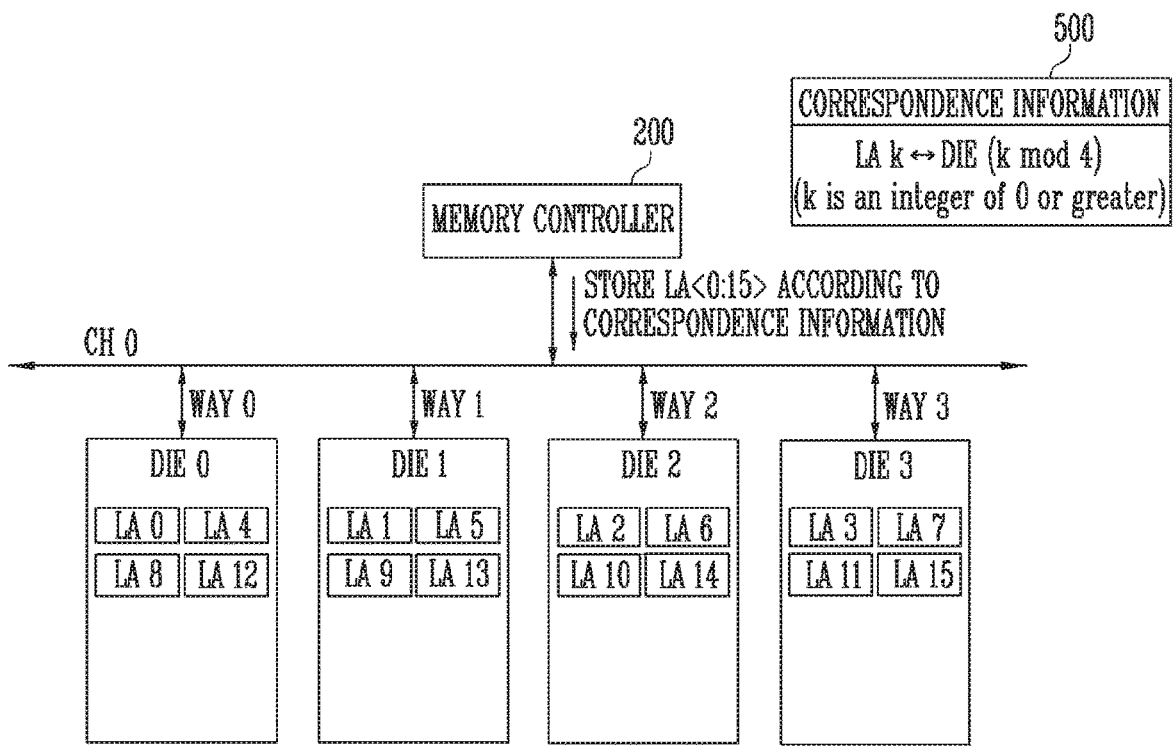
FIG. 7 is a diagram illustrating logical addresses disposed in a plurality of memory dies according to correspondence information.

FIG. 7 is a diagram illustrating logical addresses disposed in a plurality of memory dies according to correspondence information.

Referring to FIG. 7, the memory controller 200 may control the plurality of memory dies so that a write operation of storing the data chunks corresponding to the logical addresses 0 to 15 (LA 0 to LA 15) may be stored in the plurality of memory dies DIE 0 to DIE 3 according to the correspondence information 500. As a result of the write operation, the data chunks corresponding to the logical addresses 0 to 15 (LA 0 to LA 15) may be distributed and stored in the plurality of dies according to the correspondence information 500. In other words, sequential logical addresses may be disposed in a plurality of memory dies according to correspondence information.

As described above with reference to FIG. 5, the correspondence information 500 may refer to the relationship between the memory dies and the logical addresses which is determined to enable a read interleaving operation to be performed on the sequential logical addresses.

On the basis of the correspondence information 500, the data chunks corresponding to the logical addresses 0, 4, 8 and 12 (LA 0, LA 4, LA 8 and LA 12) may be stored in the DIE 0, the data chunks corresponding to the logical addresses 1, 5, 9 and 13 (LA 1, LA 5, LA 9 and LA 13) may be stored in the DIE 1, the data chunks corresponding to the logical addresses 2, 6, 10 and 14 (LA 2, LA 6, LA 10 and LA 14) may be stored in the DIE 2, and the data chunks corresponding to the logical addresses 3, 7, 11 and 15 (LA 3, LA 7, LA 11 and LA 15) may be stored in the DIE 3.

FIG. 8 is a diagram illustrating a situation where mapping relationships between memory areas and logical addresses is changed.

Referring to FIG. 8, the mapping relationships between memory areas and logical addresses as described above with reference to FIG. 7 may be changed according to a data update operation of performing program again by using a logical address corresponding to previously programmed data. More specifically, a data chunk corresponding to a logical address and originally stored in a first storage area may be updated to be stored in a second storage area according to the data update operation. Therefore, the mapping relationship of the logical address may be changed from the original first storage area to the current second storage area.

The mapping relationships between memory areas and logical addresses may be changed by background operations such as wear leveling, read reclaim and garbage collection. More specifically, the background operations such as wear leveling, read reclaim and garbage collection may involve a migration operation corresponding to movement of data chunks. Accordingly, the mapping relationships between memory areas and logical addresses corresponding to data chunks may be changed.

More specifically, since the logical addresses are randomly distributed over the plurality of memory dies due to a data update operation or a migration operation, the mapping relationships between memory areas and logical addresses may be different from that of the logical addresses as shown in FIG. 7. Therefore, a read speed with respect to sequential logical addresses may be significantly reduced.

For example, data chunks corresponding to the logical addresses 0, 1, 5, 9, 13, 2, 6, 3, 7 and 11 (LA 0, 1, 5, 9, 13, 2, 6, 3, 7 and 11) may be stored in different dies from those as described with reference to FIG. 7. For example, the data chunks corresponding to the logical address 0 (LA 0) may migrate from the memory die 0 (DIE 0) to the memory die 2 (DIE 2), the data chunks corresponding to the logical addresses 1, 5, 9 and 13 (LA 1, 5, 9 and 13) may migrate from the memory die 1 (DIE 1) to the memory die 2 (DIE 2), the data chunks corresponding to the logical addresses 2 and 6 (LA 2 and 6) may migrate from the memory die 2 (DIE 2) to the memory die 0 (DIE 0), and the data chunks corresponding to the logical addresses 3, 7 and 11 (LA 3, 7 and 11) may migrate from the memory die 3 (DIE 3) to the memory die 2 (DIE 2).

As a result, the memory die 0 (DIE 0) may include an invalid data chunk corresponding to the logical address 0 (LA 0). The memory die 0 (DIE 0) may include valid data chunks corresponding to the logical addresses 4, 8, 12, 2 and 6 (LA 4, 8, 12, 2 and 6). The valid data chunks corresponding to the logical addresses 2 and 6 (LA 2 and 6) originally stored in the DIE 2 may be currently stored in the DIE 0 in a different layout from that described with reference to FIG. 7.

The memory die 1 (DIE 1) may include the valid data chunks corresponding to the logical addresses 1, 5, 9 and 13 (LA 1, 5, 9 and 13).

The memory die 2 (DIE 2) may include the valid data chunks corresponding to the logical addresses 2 and 6 (LA 2 and 6). The memory die 2 (DIE 2) may include the valid data chunks corresponding to the logical addresses 0, 14, 5, 9, 13, 3, 7, 11 and 0 (LA 10, 14, 1, 5, 9, 13, 3, 7, 11 and 0). The valid data chunks corresponding to the logical addresses 1, 5, 9, 13, 3, 7, 11 and 0 (LA 1, 5, 9, 13, 3, 7, 11 and 0) and originally stored in DIE 0, DIE 1 and DIE 3 may be currently stored in the DIE 2 in a different layout from that described with reference to FIG. 7.

The memory die 3 (DIE 3) may include the valid data chunks corresponding to the logical addresses 3, 7 and 11 (LA 3, 7 and 11). As a result, the memory die 3 (DIE 3) may include the valid data chunk corresponding to the logical address 15 (LA 15) may be included in the memory die 3 (DIE 3).

FIG. 9 is a diagram illustrating a data migration operation according to an embodiment of the present disclosure.

Referring to FIG. 9, the memory controller 200 may select a victim area defined across the plurality of memory dies 0 to 3 (DIE 0 to DIE 3). The victim area may be an area where data chunks to be migrated are stored. The victim area may be selected from among super blocks corresponding to a group of memory blocks located at the same positions of the memory dies. For example, a super block corresponding to a group of first memory blocks of the memory die 0 (DIE 0), the memory die 1 (DIE 1), the memory die 2 (DIE 2) and the memory die 3 (DIE 3) may be selected as a victim area.

The memory controller 200 may select the victim area based on the number of valid data chunks stored in the super block. For example, a super block with the fewest valid data chunks may be selected as a victim area.

The memory controller 200 may perform a migration operation of migrating the valid data chunks in the victim area to a target area. The migration operation may include a read process of reading the valid data chunks from the victim area and buffering the read chunks in the buffer memory 210, a target die information generation process of generating target die information about memory dies in which the read valid data chunks are to be stored, and a write process of storing the valid data chunks temporarily stored in the buffer memory 210 in the plurality of memory dies on the basis of the target die information.

A migration operation according to an embodiment of the present disclosure may reduce random distribution of sequential logical addresses over a plurality of memory dies and reduce the time consumed for the write process during the migration operation.

FIG. 10 is a diagram illustrating a data migration operation according to another embodiment of the present disclosure.

Referring to FIG. 10, the memory controller 200 may select a victim area in one memory die (e.g., DIE 2) among the plurality of memory dies 0 to 3 (DIE 0 to DIE 3). The victim area may refer to an area where data chunks to be migrated are stored. The victim area may be a memory block including a plurality of pages. The memory controller 200 may select the victim area based on the number of valid data chunks stored in the memory block. For example, the memory controller 200 may select a memory block with the fewest valid data chunks as the victim area. The memory controller 200 may select the victim area on a read number. For example, the memory controller 200 may select a memory block with the largest read number as the victim area. The memory controller 200 may select the victim area on the basis of an erase number. For example, the memory controller 200 may select a memory block with the largest erase number as the victim area.

The victim area may store data chunks corresponding to logical addresses originally mapped to memory dies (e.g., DIE 0, DIE 1 and DIES) other than DIE 2 of the victim area due to the data update or data migration as described with reference to FIG. 8. For example, although the victim area is selected from the memory die 2 (DIE 2), the victim area may be storing the data chunk corresponding to the logical address 0 (LA 0) originally mapped to the memory die 0 (DIE 0). The victim area may be storing the valid data chunks corresponding to the logical addresses 1, 5, 9 and 13 (LA 1, 5, 9 and 13) originally mapped to the memory die 1 (DIE 1). The victim area may be storing the valid data chunks corresponding to the logical addresses 10 and 14 (LA 10 and 14) originally mapped to the memory die 2 DIE 2. The victim area may be storing the valid data chunks corresponding to the logical addresses 3, 7 and 11 (LA 3, 7 and 11) originally mapped to the memory die 3 (DIE 3).

The migration operation may include a read process of reading the valid data chunks from the victim area and buffering the read chunks in the buffer memory 210, a target die information generation process of generating target die information about memory dies in which the read valid data chunks are to be stored, and a write process of storing the valid data chunks temporarily stored in the buffer memory 210 in the plurality of memory dies on the basis of the target die information.

A migration operation according to an embodiment of the present disclosure may reduce random distribution of sequential logical addresses over a plurality of memory dies and reduce the time consumed for the write process during the migration operation.

Hereinafter, as described with reference to FIG. 10, the migration operation on the valid data chunks stored in the victim area included in the memory die (DIE 2) is described.

FIG. 11 is a diagram illustrating a read process of a valid data chunk according to an embodiment of the present disclosure.

Referring to FIG. 11, the memory controller 200 may perform a read process of reading valid data chunks stored in a victim area to the buffer memory 210. The read valid data chunks may correspond to the logical addresses 2, 6, 10, 14, 1, 5, 9, 13, 3, 7, 11 and 0 (LA 2, 6, 10, 14, 1, 5, 9, 13, 3, 7, 11 and 0). The valid data chunks may be stored in the buffer memory 210 according to order in which the valid data chunks are read from the memory cell array. The valid data chunks may be read randomly.

FIG. 12 is a diagram illustrating a process of generating candidate die information according to an embodiment of the present disclosure.

Referring to FIG. 12, the memory controller 200 may generate candidate die information 602 according to the correspondence information 500. The candidate die information 602 may include information on logical addresses aligned according to each memory die. In the candidate die information 602, first stripe information may indicate valid data chunks corresponding to logical addresses 0, 1, 10 and 3 (LA 0, 10 and 3). Second stripe information may indicate valid data chunks corresponding to logical addresses 5, 14 and 7 (LA 5, 14 and 7). Third stripe information may indicate valid data chunks corresponding to logical addresses 9 and 11 (LA 9 and LA 11). Fourth stripe information may indicate a valid data chunk corresponding to the logical address 13 (LA 13). When the valid data chunks are stored in the plurality of memory dies 0 to 3 (DIE 0 to DIE 3) according to the candidate die information 602, read interleaving performance may be maintained.

The candidate die information 602 may indicate the valid data chunks to be migrated to a plurality of target memory dies. The candidate die information 602 may indicate a plurality of data chunk groups to be migrated to the plurality of target memory dies, respectively. A data chunk group indicated by the candidate die information 602 may include one or more valid data chunks to be migrated to a corresponding target memory die. For example, the data chunk group to be migrated to the memory die 1 (DIE 1) may include the valid data chunks corresponding to the logical addresses 1, 5, 9 and 13 (LA 1, 5, 9 and 13). In other words, the memory controller 200 may generate the candidate die information 602 including information indicating a plurality of data chunk groups to be migrated to the plurality of target memory dies, respectively.

When the data chunks are stored in the plurality of memory dies 0 to 3 (DIE 0 to DIE 3) according to the candidate die information 602, a write operation may be performed according to the second to fourth stripe information after waiting for a reference time. In other words, the write operation according to the second to fourth stripe information may be delayed during the reference time. More specifically, since the second to fourth stripe information include empty entries (i.e., since each of the second to fourth stripe information does not indicate a complete set of data chunks to be migrated into a stripe of the target memory dies, i.e., DIE 0 to DIE 3, the write operation may be performed according to the second to fourth stripe information after waiting for the reference time. As a result, a write speed may be reduced by the reference time on the three pieces of the stripe information.

Therefore, according to an embodiment of the present disclosure, the memory controller 200 may generate target die information in consideration of a write speed and program the plurality of memory dies with the valid data chunks on the basis of the target die information.

Figure 13:
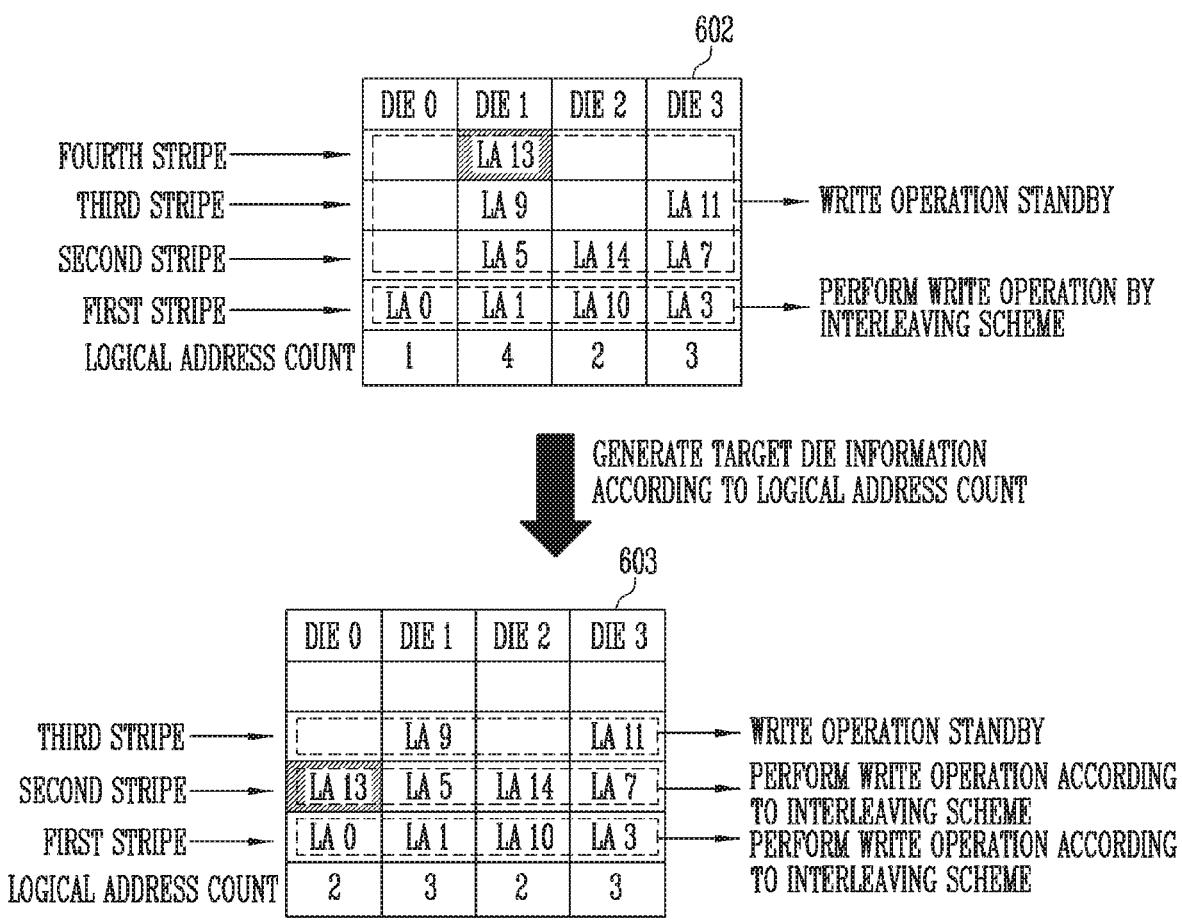
FIG. 13 is a diagram illustrating a process of generating target die information according to an embodiment of the present disclosure.

FIG. 13 is a diagram illustrating a process of generating target die information according to an embodiment of the present disclosure.

Referring to FIG. 13, the memory controller 200 may generate the target die information 603 according to a logical address count corresponding to a memory die.

According to the candidate die information 602, one, four, two and three logical addresses may correspond to the memory die 0 (DIE 0), the memory die 1 (DIE 1), the memory die 2 (DIE 2) and the memory die 3 (DIE 3), respectively.

The memory controller 200 may generate the target die information 603 on the basis of the logical address count corresponding to each memory die. More specifically, the memory controller 200 may generate the target die information 603 to change the migration destination of valid data chunks from a first memory die, into which the greatest number of data chunks are to be migrated, according to the candidate die information 602, to a second memory die, into which the smallest amount of data chunks are to be migrated, according to the target die information 603. Alternatively, the memory controller 200 may generate the target die information 603 to change the migration destination of valid data chunks from a third memory die according to the candidate die information 602 to the second memory die according to the target die information 603. The data chunk corresponds to a logical address and thus a number of data chunks to be migrated into a target memory die may be represented by a number of logical addresses corresponding to the data chunks to be migrated into the target memory die.

The memory controller 200 may generate the target die information 603 so that each memory die may store the same number of valid data chunks, or so that the difference in number of valid data chunks to be migrated into each memory die is minimal.

That is, in accordance with an embodiment of the present disclosure, the memory controller 200 may relate, during migration of data chunks in the victim area into one or more stripes each selected over N memory dies in the memory device 100 and sharing a single channel, the data chunks to the N memory dies through a modulo N operation on logical addresses of the data chunks. The memory controller 200 may further relate, when there are two or more incomplete sets of data chunks, the individual data chunks of the incomplete sets to one or more of the N memory dies to configure a complete set of data chunks to be stored into a single stripe. An incomplete set does not have a complete set of data chunks to be stored into a single stripe.

The target die information 603 may include remapping information between the plurality of memory dies and the plurality of valid data chunks to change the group association of a data chunk. As described above, a single data chunk group may be set to be migrated into one of the target memory dies. That is, a single data chunk group may correspond to a single memory die. The target die information 603 may include remapping information between the plurality of memory dies and the plurality of valid data chunks on the basis of a number of valid data chunks included in each of the data chunk groups in the candidate die information 602.

For example, referring to the candidate die information 602 shown in FIG. 13, the memory dies 0, 2 and 3 (DIE 0, 2 and 3) may be set to store one, four, two and three valid data chunks, respectively. In other words, the data chunk group to be migrated into the memory die 1 (DIE 1) includes the greatest number of valid data chunks and the data chunk group to be migrated into the memory die 0 (DIE 0) includes the smallest number of valid data chunks. In accordance with an embodiment of the present disclosure, the memory controller 200 may remap a valid data chunk corresponding to the logical address 13 (LA 13), among the valid data chunks included in the data chunk group corresponding to the memory die 1 (DIE 1), to belong to another data chunk group, for example, the memory die 0 (DIE 0) which includes the fewest valid data chunks.

According to the target die information 603, the first stripe information may indicate valid data chunks corresponding to the logical addresses 0, 1, 10 and 3 (LA 0, 1, 10 and 3). The second stripe information may indicate the valid data chunks corresponding to the logical addresses 13, 5, 14, and 7 (LA 13, LA 5, LA 14 and LA 7). The third stripe information may indicate the valid data chunks corresponding to the logical addresses 9 and 11 (LA 9 and LA 11).

According to the target die information 603, since each piece of the first stripe information and the second stripe information indicates a complete set of data chunks to be migrated into a stripe of the target memory dies, a write operation may be performed according to an interleaving method. As for the third stripe information, since no data chunk is to be migrated into the memory die 0 (DIE 0) or the memory die 2 (DIE 2), a write operation may be performed thereon after waiting for a reference time. In other words, the write operation for the third stripe information may be delayed by a delay time.

During a write operation based on candidate die information, the write operation may be performed after waiting for the reference time with respect to each of the second to fourth stripe information. However, during a write operation based on target die information, the write operation may be performed after waiting for the reference time with respect to only the third stripe information, so that a write speed may be increased.

As a result, according to an embodiment of the present disclosure, a migration operation may reduce random distribution of sequential logical addresses over a plurality of memory dies by generating candidate die information according to correspondence information. In addition, by generating target die information on logical address counts corresponding to a plurality of memory dies, respectively, the time consumed for the write process during the migration operation may be reduced.

Figure 14:
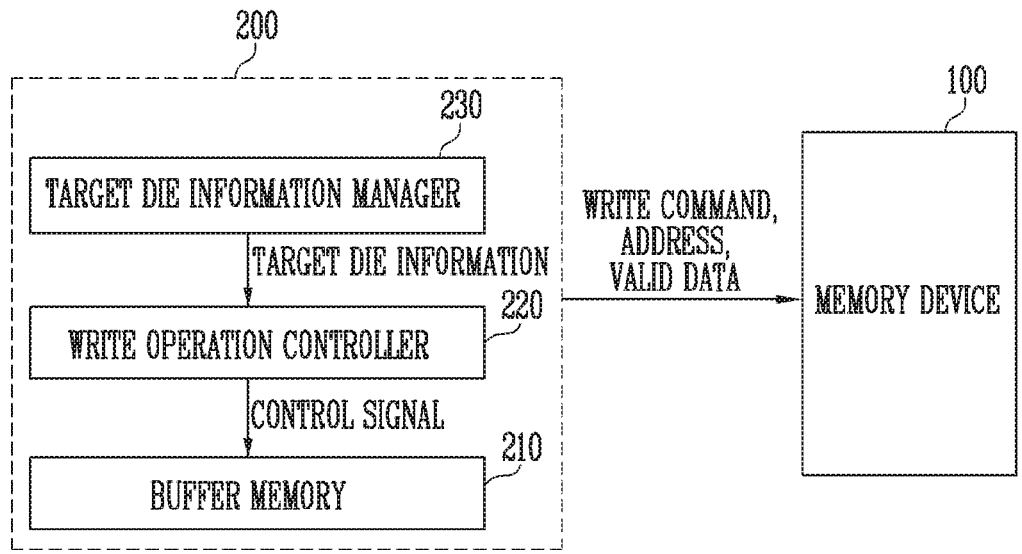
FIG. 14 is a diagram illustrating a memory controller according to an embodiment of the present disclosure.

FIG. 14 is a diagram illustrating the memory controller 200 according to an embodiment of the present disclosure.

Referring to FIG. 14, the memory controller 200 may include the buffer memory 210, the write operation controller 220 and the target die information manager 230. The memory device 100 may include a plurality of memory dies.

While migrating valid data chunks from the victim area into the stripes of the memory dies DIE 0 to DIE 3, the buffer memory 210 may temporarily store the valid data chunks read from the victim area of the memory device 100, and the valid data chunks stored in the buffer memory 210 may be stored in the stripes of the plurality of memory dies included in the memory device 100 according to the target die information 603.

The target die information manager 230 may generate target die information 603 on memory dies in which the valid data chunks stored in the buffer memory 210 are respectively migrated, and may transfer the target die information 603 to the write operation controller 220.

The target die information manager 230 may generate the target die information 603 in consideration of the interleaving scheme. The target die information manager 230 may generate candidate die information 602 corresponding to the correspondence information. The target die information manager 230 may generate target die information 603 on the basis of the logical address count corresponding to each of the memory dies represented by the candidate die information 602.

The write operation controller 220 may control the buffer memory 210 to transfer the valid data chunks to the memory device 100. The write operation controller 220 may control the plurality of memory dies so that the valid data chunks transferred to the memory device 100 may be stored in the plurality of memory dies included in the memory device 100 according to the target die information 603.

Figure 15:
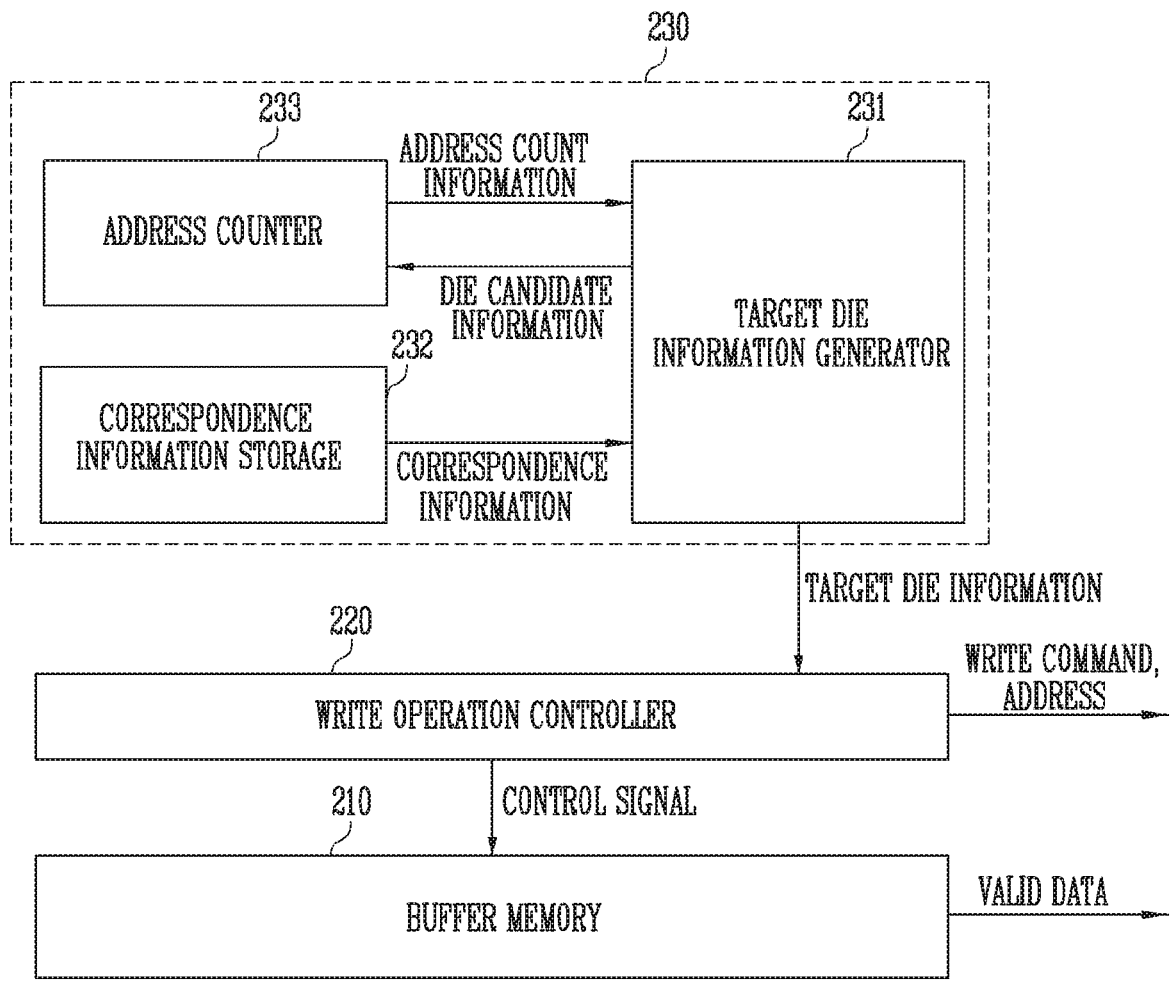
FIG. 15 is a diagram illustrating a target die information manager.

FIG. 15 is a diagram illustrating the target die information manager 230.

Referring to FIG. 15, the target die information manager 230 may include a target die information generator 231, a correspondence information storage 232, and an address counter 233.

The correspondence information storage 232 may store correspondence information 500 between logical addresses of data chunks and the plurality of memory dies into which the data chunks are to be migrated. The correspondence information may be previously determined so that a read interleaving operation may be performed on sequential logical addresses. The correspondence information storage 232 may transfer the correspondence information 500 to the target die information generator 231.

The target die information generator 231 may generate candidate die information 602 based on the correspondence information 500, as described with reference to FIG. 12. The target die information generator 231 may transfer the candidate die information 602 to the address counter 233.

The address counter 233 may count the logical addresses corresponding to the data chunks to be migrated into each of the plurality of memory dies according to the candidate die information 602, and generate logical address count information for each of the memory dies. The address counter 233 may transfer the logical address count information to the target die information generator 231.

The target die information generator 231 may receive the address count information and calculate a difference of logical address counts between the memory dies. When the difference of logical address counts between any two of the plurality of memory dies is 1 (one) or less, the target die information generator 231 may use the candidate die information 602 as target die information 603. When the difference of logical address counts between any two of the plurality of memory dies exceeds 1 (one), the target die information generator 231 may generate target die information 603.

The target die information generator 231 may generate the target die information 603 about each of the memory dies in which each of the temporarily stored data chunks is migrated. The target die information generator 231 may generate the target die information 603 by changing the candidate die information 602 so that the difference of logical address counts between any two of the plurality of memory dies is 1 (one) or less.

More specifically, the target die information generator 231 may generate the target die information 603 so that the migration destination of valid data chunks is changed from a first memory die, into which the greatest amount of data chunks are to be migrated to a second memory die, into which the smallest amount of data chunks are to be migrated, according to the target die information 603.

Alternatively, the target die information generator 231 may generate target die information 603 so that the migration destination of valid data chunks is changed from a third memory die to the second memory die according to the target die information 603.

As a result, the target die information generator 231 may generate target die information 603 by changing the candidate die information 602 so that the difference of logical address counts between any two of the plurality of memory dies is 1 (one) or less. The target die information generator 231 may transfer the target die information 603 to the write operation controller 220.

The write operation controller 220 may control the buffer memory 210 so that valid data chunks stored in the buffer memory 210 may be transferred to the memory device 100. The write operation controller 220 may transfer a write command and a physical address to the memory device 100. The write operation controller 220 may control the plurality of memory dies so that the valid data chunks may be stored in the plurality of memory dies according to the target die information 603.

Figure 16:
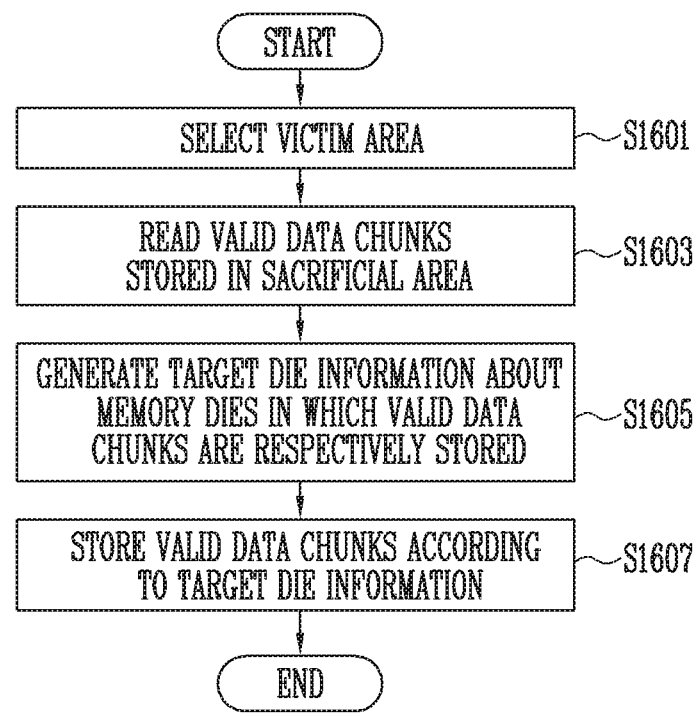
FIG. 16 is a flowchart illustrating a migration method according to another embodiment of the present disclosure.

FIG. 16 is a diagram illustrating a method of according to another embodiment of the present disclosure.

Referring to FIG. 16, at step S1601, the memory controller 200 may select a victim area included in at least one of the plurality of memory dies. The victim area may refer to an area where data chunks to be migrated are stored. The victim area may be selected based on the number of stored valid data chunks. For example, a storage area with the fewest stored data chunks among the plurality of memory dies may be selected as the victim area.

At step S1603, the memory controller 200 may perform a read process of reading the valid data chunks stored in the victim area into the buffer memory 210. The memory controller 200 may read the valid data chunks according to an interleaving scheme or a non-interleaving scheme and may temporarily store the read valid data chunks in the buffer memory 210.

At step S1605, the memory controller 200 may generate target die information 603 about memory dies in which the valid data chunks are respectively stored. The memory controller 200 may generate candidate die information 602 based on correspondence information 500 and the target die information 603 based on a logical address count corresponding to the data chunks to be migrated into each of the plurality of memory dies.

At step S1607, the memory controller 200 may perform a write process of controlling the plurality of memory dies and the buffer memory 210 so that the valid data chunks may be stored in the plurality of memory dies according to the target die information 603. The memory controller 200 may control the plurality of memory dies and the buffer memory 210 so that a write interleaving operation may be performed in units of stripes.

Figure 17:
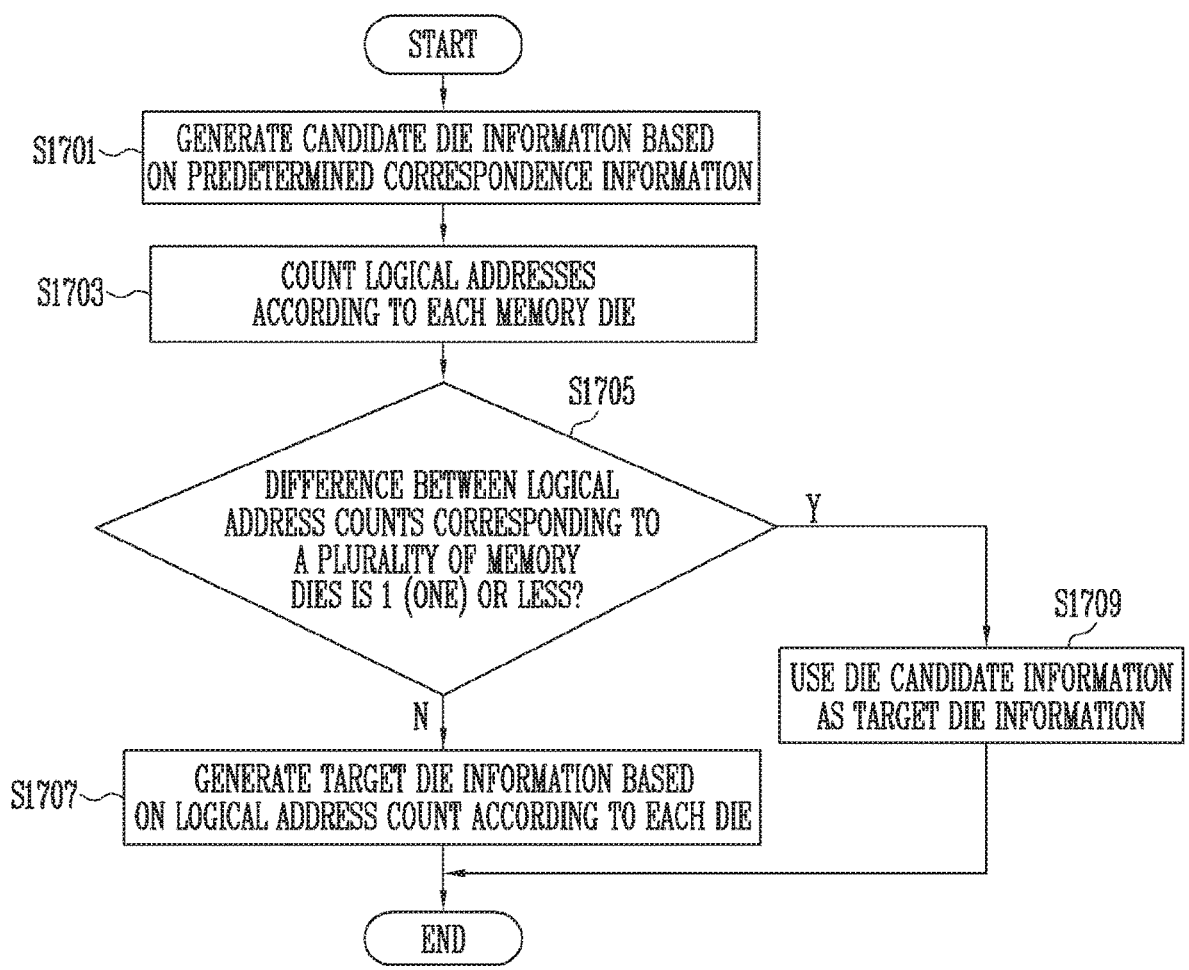
FIG. 17 is a flowchart illustrating a process of generating target die information.

FIG. 17 is a flowchart illustrating a process of generating target die information 603.

Referring to FIG. 17, at step S1701, the memory controller 200 may generate candidate die information 602 on the basis of correspondence information 500. The correspondence information 500 may include information about the relationship between logical addresses and the plurality of memory dies. The correspondence information 500 may be previously determined to improve read interleaving performance.

At step S1703, the memory controller 200 may count the logical addresses corresponding to the data chunks to be migrated into each of the plurality of memory dies according to the candidate die information 602.

At step S1705, the memory controller 200 may determine whether the difference of logical address counts between any two of the plurality of memory dies is 1 (one) or less. When the difference of logical address counts between any two of the plurality of memory dies is one or less, the memory controller 200 may perform step S1709. When the difference of logical address counts between any two of the plurality of memory dies exceeds one, the memory controller 200 may perform step S1707.

At step S1709, the memory controller 200 may use the candidate die information 602 as the target die information 603. Based on the relationships between the plurality of memory dies and the data chunks represented by the logical addresses according to the candidate die information 602, a piece of the stripe information including an empty entry may be present in the candidate die information 602 when the difference of logical address counts between any two of the plurality of memory dies is one or more.

More specifically, when the difference of logical address counts between any two of the plurality of memory dies is 0 (zero), stripe information including an empty entry may not be present in the candidate die information 602. Therefore, a write operation may be performed on all stripe information according to an interleaving scheme.

More specifically, when the difference of logical address counts between any two of the plurality of memory dies is one, a piece of stripe information including an empty entry may be included in the candidate die information 602. Therefore, a write operation may be performed on the basis of the remaining stripe information, except for the stripe information including an empty entry, according to the interleaving scheme.

At step S1707, the memory controller 200 may generate target die information 603 on the basis of the logical address count corresponding to the data chunks to be migrated into each of the plurality of memory dies. Based on the relationships between the plurality of memory dies and the data chunks represented by the logical addresses within the candidate die information 602, when the difference of logical address counts between any two of the plurality of memory dies exceeds one, there may be at least two pieces of stripe information including an empty entry in the candidate die information 602. Therefore, target die information 603 may be generated to reduce the pieces of stripe information including an empty entry. The target die information 603 may represent memory dies in which valid data chunks are respectively migrated. The target die information 603 may be determined such that the difference of logical address counts between any two of the plurality of memory dies is one or less.

Figure 18:
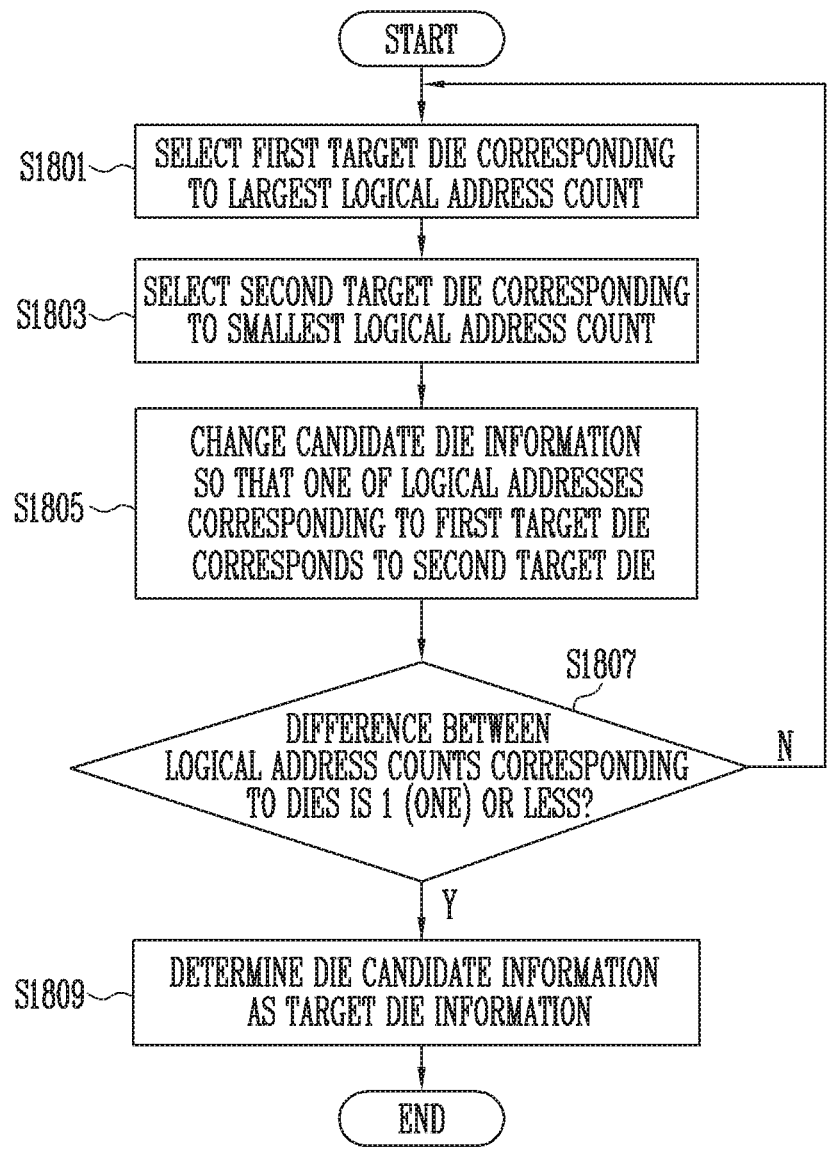
FIG. 18 is a flowchart illustrating a process of generating target die information based on the logical address count.

FIG. 18 is a flowchart illustrating a process of generating target die information 603 based on a logical address count.

Referring to FIG. 18, at step S1801, the memory controller 200 may select a first target die corresponding to the largest logical address count, among the plurality of memory dies within the candidate die information 602.

At step S1803, the memory controller 200 may select a second target die having the smallest logical address count, among the plurality of memory dies within the candidate die information 602.

At step S1805, the memory controller 200 may change the candidate die information 602 so that one of the logical addresses corresponding to the first target die may correspond to the second target die.

At step S1807, the memory controller 200 may determine whether the difference of logical address counts between any two of the plurality of memory dies is one or less. When the difference of logical address counts between any two of the plurality of memory dies is one or less, the memory controller 200 may perform step S1809. When the difference of logical address counts between any two of the plurality of memory dies exceeds one, the memory controller 200 may perform step S1801.

At steps S1801 to S1807, the memory controller 200 may perform each step by using the changed candidate die information 602.

At step S1809, the memory controller 200 may generate target die information 603. More specifically, the memory controller 200 may use the candidate die information 602 indicating that the difference of logical address counts between any two of the plurality of memory dies is one or less as the target die information 603.

Figure 19:
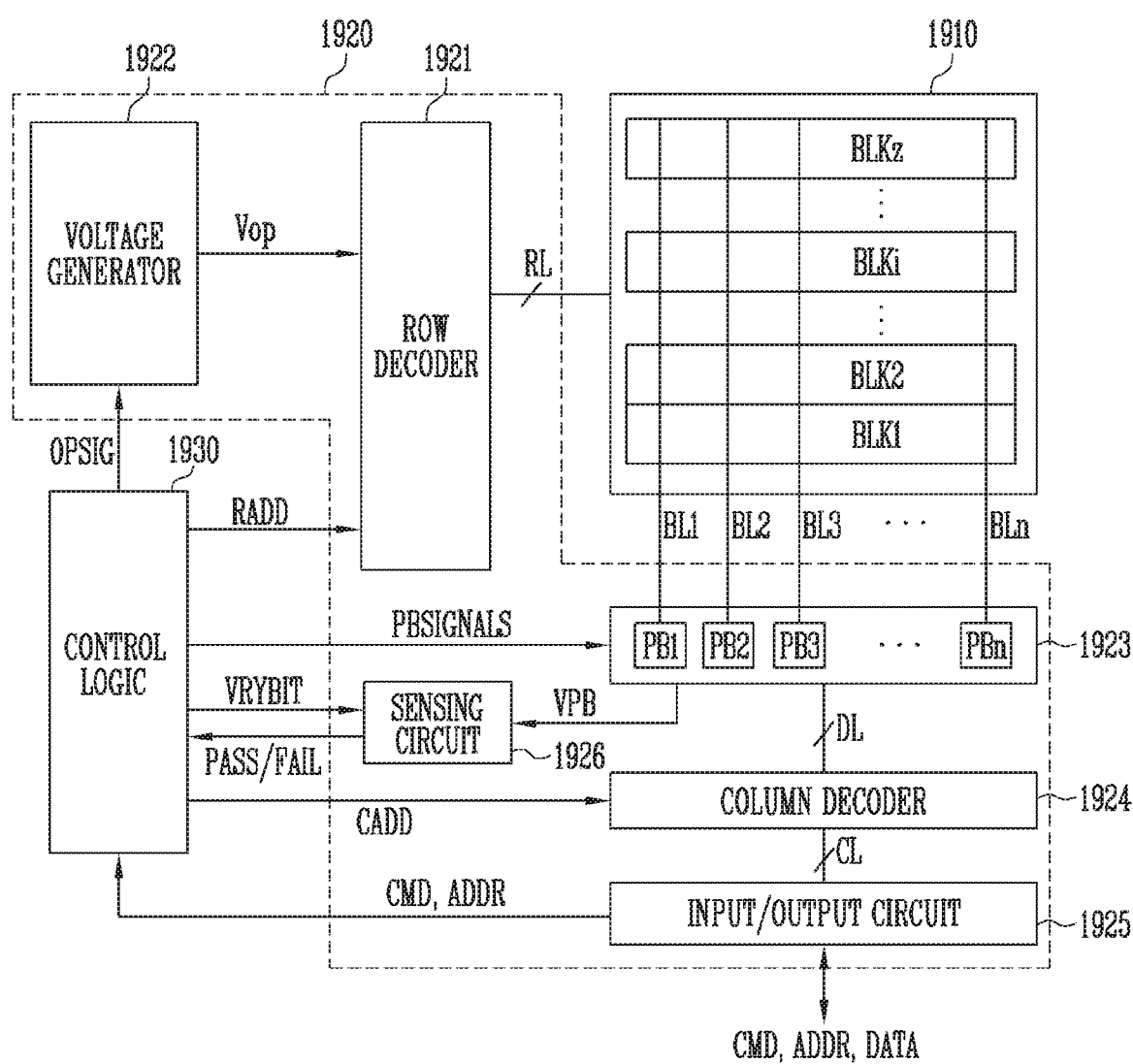
FIG. 19 is a diagram illustrating a memory die according to an embodiment of the present disclosure.

FIG. 19 is a diagram illustrating a memory die according to an embodiment of the present disclosure.

Referring to FIG. 19, a memory die may include a memory cell array 1910, a peripheral circuit 1920 and control logic 1930.

The memory cell array 1910 may include a plurality of memory blocks BLK1 to BLKz. The plurality of memory blocks BLK1 to BLKz may be coupled to a row decoder 1921 through row lines RL. The memory blocks BLK1 to BLKz may be coupled to a page buffer group 1923 through bit lines BL1 to BLm. Each of the plurality of memory blocks BLK1 to BLKz may include a plurality of memory cells. In an embodiment, the plurality of memory cells may be nonvolatile memory cells. Memory cells coupled to the same word line may be defined as one page. Therefore, each memory block may include a plurality of pages.

The row lines RL may include at least one source select line, a plurality of word lines, and at least one drain select line.

Each of the memory cells included in the memory cell array 1910 may include a single-level cell (SLC) storing a single data bit, a multi-level cell (MLC) storing two data bits, a triple-level cell (TLC) storing three data bits, or a quad-level cell (QLC) storing four data bits.

The peripheral circuit 1920 may be configured to perform program, read and erase operations on the selected area of the memory cell array 1910 in response to control of the control logic 1930. The peripheral circuit 1920 may drive the memory cell array 1910. For example, the peripheral circuit 1920 may apply various operating voltages to the row lines RL and bit lines BL1 to BLn, or discharge the applied voltages in response to control of the control logic 1930.

The peripheral circuit 1920 may include the row decoder 1921, a voltage generator 1922, the page buffer group 1923, a column decoder 1924, and an input/output circuit 1925.

The row decoder 1921 may be coupled to the memory cell array 1910 through the row lines RL. The row lines RL may include at least one source select line, a plurality of word lines, and at least one drain select line. According to an embodiment, the word lines may include normal word lines and dummy word lines. According to an embodiment, the row lines RL may further include a pipe select line.

The row decoder 1921 may be configured to operate in response to control of the control logic 1930. The row decoder 1921 may receive a row address RADD from the control logic 1930.

The row decoder 1921 may be configured to decode the row address RADD. The row decoder 1921 may select at least one memory block among the memory blocks BLK1 to BLKz according to the decoded block address. The row decoder 1921 may select at least one word line of the selected memory block so as to apply voltages generated by the voltage generator 1922 to at least one word line according to the decoded address.

For example, during a program operation, the row decoder 1921 may apply a program voltage to the selected word line and a pass voltage having a lower level than the program voltage to unselected word lines. During a program verify operation, the row decoder 1921 may apply a verify voltage to the selected word line and a verify pass voltage greater than the verify voltage to the unselected word lines. During a read operation, the row decoder 1921 may apply a read voltage to the selected word line and a read pass voltage greater than the read voltage to the unselected word lines.

According to an embodiment, an erase operation of the memory cell may be performed in unit of a memory block. During an erase operation, the row decoder 1921 may select one of the memory blocks according to the decoded address. During the erase operation, the row decoder 1921 may apply a ground voltage to word lines coupled to the selected memory block.

The voltage generator 1922 may be controlled by the control logic 1930. The voltage generator 1922 may be configured to generate a plurality of voltages by using an external power voltage supplied to the memory device. More specifically, the voltage generator 1922 may generate various operating voltages Vop for program, read and erase operations in response to an operation signal OPSIG. For example, the voltage generator 1922 may generate a program voltage, a verify voltage, a pass voltage, a read voltage, and an erase voltage in response to the control of the control logic 1930.

According to an embodiment, the voltage generator 1922 may generate an internal power voltage by regulating an external power voltage. The internal power voltage generated by the voltage generator 1922 may be used as an operating voltage of a memory die.

According to an embodiment, the voltage generator 1922 may generate a plurality of voltages by using an external power voltage or an internal power voltage.

For example, the voltage generator 1922 may include a plurality of pumping capacitors for receiving the internal power voltage, and generate a plurality of voltages by selectively activating the plurality of pumping capacitors in response to the control of the control logic 1930.

The plurality of generated voltages may be supplied to the memory cell array 1910 by the row decoder 1921.

The page buffer group 1923 may include first to nth page buffers PB1 to PBn. The first to nth page buffers PB1 to PBn may be coupled to the memory cell array 1910 through the first to nth bit lines BL1 to BLn, respectively. The first to nth page buffers PB1 to PBn may operate in response to the control of the control logic 1930. More specifically, the first to nth page buffers PB1 to PBn may operate in response to page buffer control signals PBSIGNALS. For example, the first to nth page buffers PB1 to PBn may temporarily store data received through the bit lines BL1 to BLn, or may sense voltages or currents in the bit lines BL1 to BLn during a read or verify operation.

More specifically, during a program operation, the first to nth page buffers PB1 to PBn may transfer data DATA received through the input/output circuit 1925 to selected memory cells through the first to nth bit lines BL1 to BLn when a program pulse is applied to a selected word line during a program operation. Memory cells of the selected page may be programmed according to the transferred data DATA. A memory cell coupled to a bit line to which a program permission voltage (e.g., a ground voltage) is applied may have an increased threshold voltage. A threshold voltage of a memory cell coupled to a bit line to which a program inhibition voltage (for example, a power voltage) is applied may be maintained. During a program verify operation, the first to nth page buffers PB1 to PBm may read page data from the selected memory cells through the first to nth bit lines BL1 to BLn, respectively.

During a read operation, the first to nth page buffers PB1 to PBn may read the data DATA from the memory cells of the selected page through the first to nth bit lines BL1 to BLn and output the read data DATA to the input/output circuit 1925 in response to control of the column decoder 1924.

During an erase operation, the first to nth page buffers PB1 to PBn may float the first to nth bit lines BL1 to BLn.

The column decoder 1924 may transfer data between the input/output circuit 1925 and the page buffer group 1923 in response to a column address CADD. For example, the column decoder 1924 may exchange data with the first to nth page buffers PB1 to PBn through data lines DL, or with the input/output circuit 1925 through column lines CL.

The input/output circuit 1925 may transfer the command CMD and the address ADD from the memory controller 200 described above with reference to FIG. 1 to the control logic 1930, or may exchange the data DATA with the column decoder 1924.

A sensing circuit 1926 may generate a reference current in response to an allowable bit signal VRYBIT and compare a sensing voltage VPB received from the page buffer group 1923 with a reference voltage generated by the reference current to output a pass signal PASS or a fail signal FAIL during a read operation or a verify operation.

The control logic 1930 may control the peripheral circuit 1920 by outputting the operation signal OPSIG, the row address RADD, the page buffer control signals PBSIG-NALS and the allowable bit signal VRYBIT in response to the command CMD and the address ADD. Further, the control logic 1930 may determine whether a verify operation has passed or failed in response to the pass or fail signal PASS or FAIL.

Figure 20:
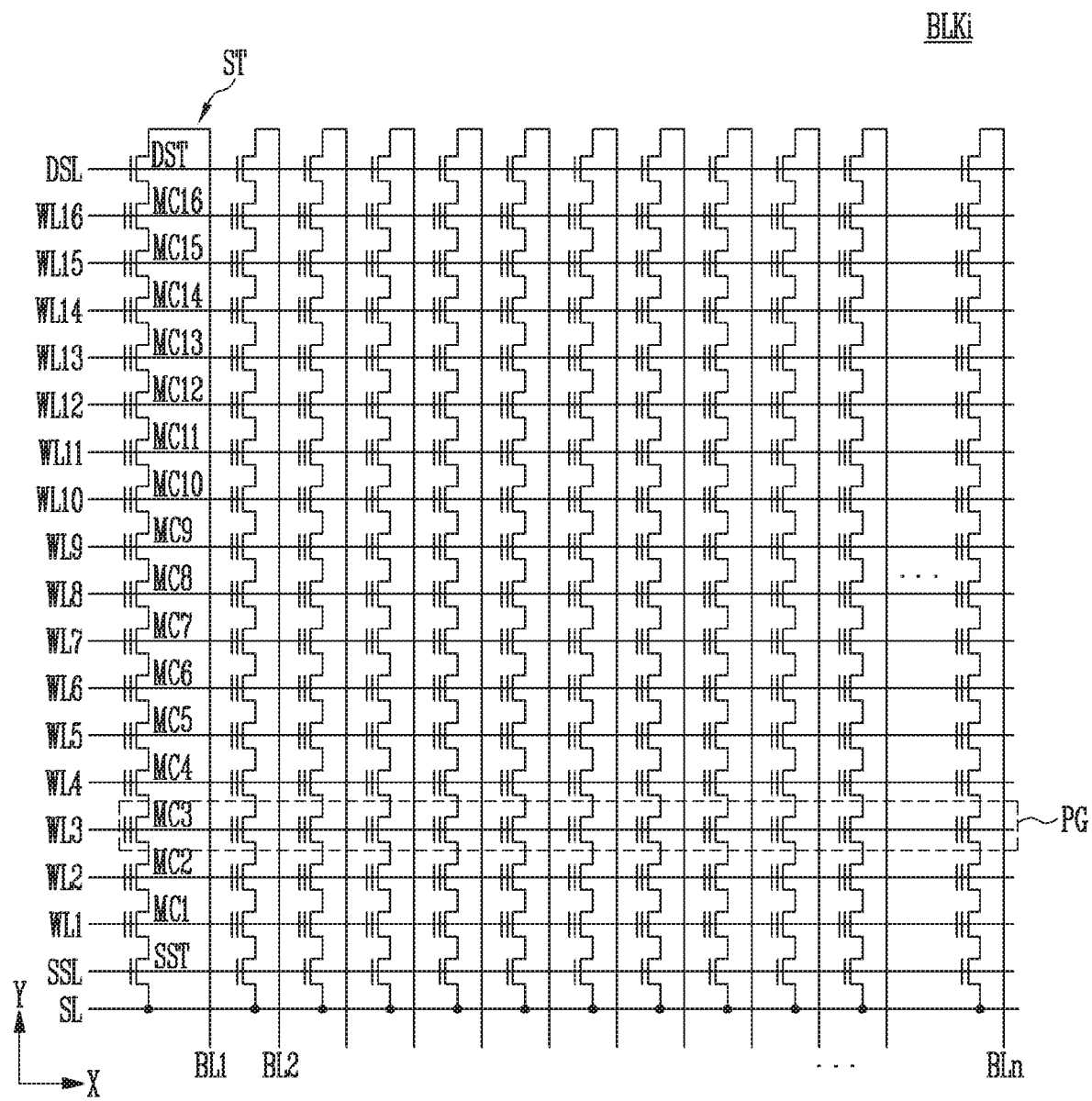
FIG. 20 is a diagram illustrating a memory block BLKi of FIG. 19.

FIG. 20 is a diagram illustrating a memory block BLKi of FIG. 19.

Referring to FIG. 20, the memory block BLKi may be coupled to a plurality of word lines arranged in parallel between a first select line and a second select line. The first select line may be a source select line SSL and the second select line may be a drain select line DSL. Specifically, the memory block BLKi may include a plurality of strings ST coupled between the bit lines BL1 to BLm and a source line SL. The bit lines BL1 to BLm may be coupled to the strings ST, respectively, and the source line SL may be coupled in common to the strings ST. Since the strings ST may have the same configuration, the string ST coupled to the first bit line BL1 is described in detail by way of example.

The string ST may include a source select transistor SST, a plurality of memory cells MC1 to MC16, and a drain select transistor DST coupled in series between the source line SL and the first bit line BL1. Each string ST may include at least one source select transistor SST, at least one drain select transistors DST, and more than the 16 memory cells MC1 to MC16 shown in FIG. 12.

A source of the source select transistor SST may be coupled to the source line SL and a drain of the drain select transistor DST may be coupled to the first bit line BL1. The memory cells MC1 to MC16 may be coupled in series between the source select transistor SST and the drain select transistor DST. Gates of the source select transistors SST included in different strings ST may be coupled to the source select line SSL, gates of the drain select transistors DST may be coupled to the drain select line DSL, and gates of the memory cells MC1 to MC16 may be coupled to a plurality of word lines WL1 to WL16. A group of memory cells coupled to the same word line, among memory cells included in different strings ST, may be referred to as a physical page PG. Therefore, the memory block BLKi may include the same number of physical pages PG as word lines WL1 to WL16.

A single memory cell may store one bit of data. This memory cell is generally called a single level cell (SLC). One physical page PPG may store one logical page (LPG) data. One LPG data may include as many data bits as the number of cells included in one physical page PG.

In addition, a single memory cell may store two or more bits of data. One physical page PG may store data corresponding to two or more logical pages LPG.

Figure 21:
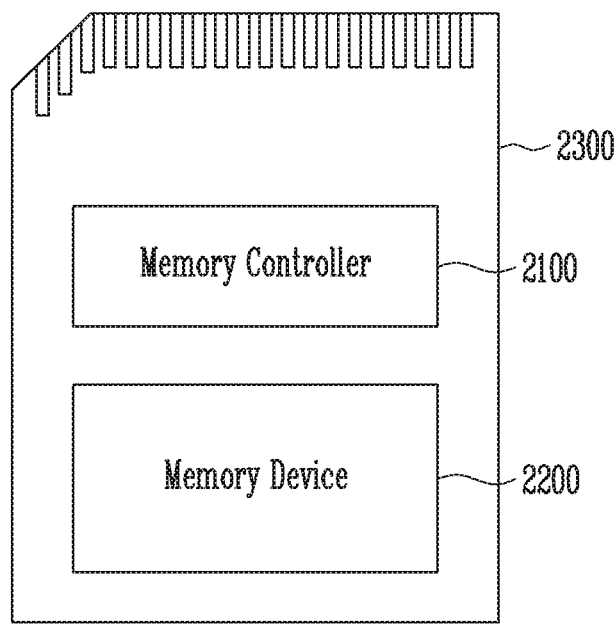
FIG. 21 is a block diagram illustrating an example of a memory card system to which a storage device is applied according to an embodiment of the present disclosure.

FIG. 21 is a block diagram illustrating an example of a memory card system 2000 to which a storage device is applied according to an embodiment of the present disclosure.

Referring to FIG. 21, the memory card system 2000 may a memory controller 2100, a memory device 2200 and a connector 2300.

The memory controller 2100 may be coupled to the memory device 2200. The memory controller 2100 may access the memory device 2200. For example, the memory controller 2100 may control read, write, erase, and background operations of the memory device 2200. The memory controller 2100 may be configured to provide an interface between the memory device 2200 and the host. The memory controller 2100 may be configured to drive firmware for controlling the memory device 2200.

In an embodiment, the memory controller 2100 may include components, such as a Random Access Memory (RAM), a processing unit, a host interface, a memory interface, and an ECC block.

The memory controller 2100 may communicate with an external device through the connector 2300. The memory controller 2100 may communicate with an external device (e.g., host) based on a specific communication protocol. For example, the memory controller 2100 may communicate with the external device through at least one of various communication protocols such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (DATA), small computer small interface (SCSI), enhanced small disk interface (ESDI), integrated drive electronics (IDE), Fire Tire, universal flash storage (UFS), WiFi, Bluetooth, and/or nonvolatile memory express (NVMe) protocols. For example, the connector 2300 may be defined by at least one of the above-described various communication protocols.

In an embodiment, the memory device 2200 may be embodied as any of various nonvolatile memory devices, such as an Electrically Erasable and Programmable ROM (EEPROM), a NAND flash memory, a NOR flash memory, a Phase-change RAM (PRAM), a Resistive RAM (Re-RAM), a Ferroelectric RAM (FRAM), and a Spin-Torque Magnetic RAM (STT-MRAM).

The memory controller 2100 and the memory device 2200 may be integrated into a single semiconductor device to form a memory card. For example, the memory controller 2100 and the memory device 2200 may be integrated into a single semiconductor device to form a memory card, such as a personal computer memory card international association (PCMCIA), a compact flash card (CF), a smart media card (SM or SMC), a memory stick multimedia card (MMC, RS-MMC, or MMCmicro), an SD card (SD, miniSD, microSD, or SDHC), and/or a universal flash storage (UFS).

Figure 22:
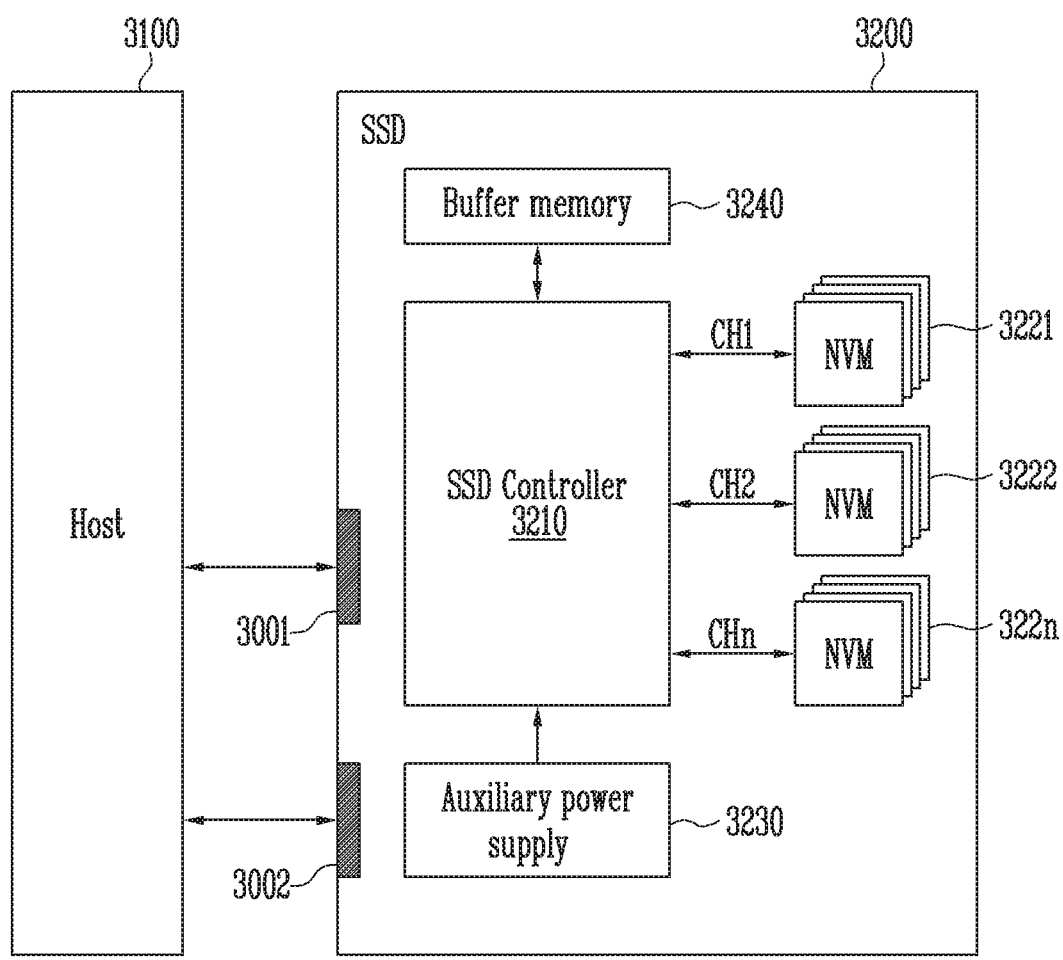
FIG. 22 is a block diagram illustrating an example of a solid state drive (SSD) system to which a storage device is applied according to an embodiment of the present disclosure.

FIG. 22 is a block diagram illustrating an example of a solid state drive (SSD) system 3000 to which a storage device is applied according to an embodiment of the present disclosure.

Referring FIG. 22, the SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322$n$, an auxiliary power supply 3230, and a buffer memory 3240.

In an embodiment, the SSD controller 3210 may perform the function of the memory controller 200 as described above with reference to FIG. 1.

The SSD controller 3210 may control the plurality of flash memories 3221 to 322$n$ in response to the signals SIG received from the host 3100. According to an embodiment, the signals SIG may be based on the interfaces of the host 3100 and the SSD 3200. For example, the signals SIG may be defined by at least one of various interfaces such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), WiFi, Bluetooth, and/or nonvolatile memory express (NVMe) interfaces.

The auxiliary power supply 3230 may be coupled to the host 3100 through the power connector 3002. The auxiliary power supply 3230 may be supplied and charged with the power PWR from the host 3100. The auxiliary power supply 3230 may supply the power of the SSD 3200 when power is not smoothly supplied from the host 3100. For example, the auxiliary power supply 3230 may be positioned inside or outside the SSD 3200. For example, the auxiliary power supply 3230 may be disposed in a main board and supply auxiliary power to the SSD 3200.

The buffer memory 3240 may function as a buffer memory of the SSD 3200. For example, the buffer memory 3240 may temporarily store data received from the host 3100 or data received from the plurality of flash memories 3221 to 322n, or may temporarily store metadata (e.g., mapping tables) of the flash memories 3221 to 322n. The buffer memory 3240 may include volatile memories such as DRAM, SDRAM, DDR SDRAM, LPDDR SDRAM, and GRAM or nonvolatile memories such as FRAM, ReRAM, STT-MRAM, and PRAM.

Figure 23:
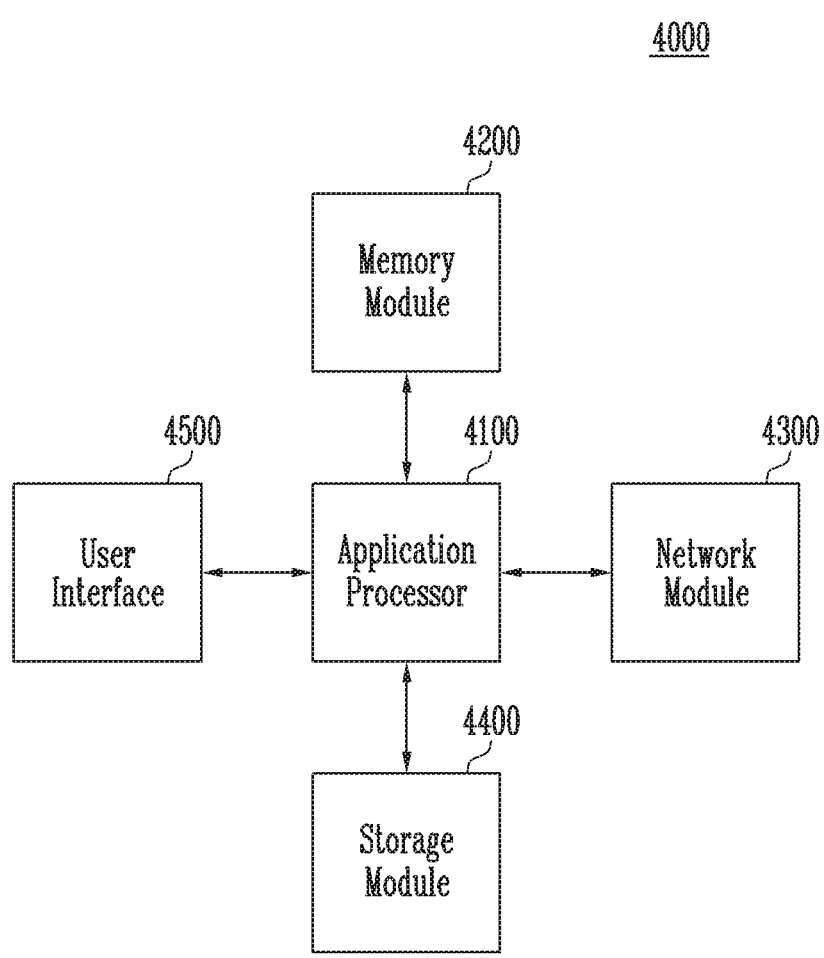
FIG. 23 is a block diagram illustrating a user system to which a storage device is applied according to an embodiment of the present disclosure.

FIG. 23 is a block diagram illustrating a user system 4000 to which a storage device is applied according to an embodiment.

Referring to FIG. 23, the user system 4000 may include an application processor 4100, a memory module 4200, a network module 4300, a storage module 4400, and a user interface 4500.

The application processor 4100 may run components included in the user system 4000, an operating system (OS), or a user program. For example, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDARM, LPDDR3 SDRAM, and LPDDR3 SDRAM or nonvolatile RAMs such as PRAM, ReRAM, MRAM, and FRAM. For example, the application processor 4100 and the memory module 4200 may be packaged based on package-on-package (POP) and may then be provided as a single semiconductor package.

The network module 4300 may communicate with external devices. For example, the network module 4300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), Wi ax, WLAN, UWB, Bluetooth, or WiFi communication. For example, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. For example, the storage module 4400 may be embodied as a nonvolatile semiconductor memory device, such as a Phase-change RAM (PRAM), a Magnetic RAM (MRAM), a Resistive RAM (RRAM), a NAND flash memory, a NOR flash memory, or a NAND flash memory having a three-dimensional (3D) structure. For example, the storage module 4400 may be provided as a removable storage medium (i.e., removable drive), such as a memory card or an external drive of the user system 4000.

For example, the storage module 4400 may include a plurality of non-volatile memory devices, and the plurality of non-volatile memory devices may operate in the same manner as the memory device described above with reference to FIGS. 10 to 13. The storage module 4400 may operate in the same manner as the storage device 50 described above with reference to FIG. 1.

The user interface 4500 may include interfaces which input data or instructions to the application processor 4100 or output data to an external device. According to an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a Liquid Crystal Display (LCD), an Organic Light Emitting Diode (OLED) display device, an Active Matrix OLED (AMOLED) display device, an LED, a speaker, and a motor.

As described above, according to an embodiment of the present disclosure, a write speed during a migration operation may be improved. In addition, a read speed may be improved after the migration operation is completed.

According to embodiments of the present disclosure, a memory controller and an operating method thereof may provide improved read interleaving performance and write interleaving performance.

While various embodiments of the present invention have been described in some detail, the present invention is not limited to any particular embodiment nor to the details provided. There are others ways of implementing the invention, as one skilled in the art will appreciate in light of the foregoing disclosure. The disclosed embodiments are thus illustrative, not restrictive. The present invention encompasses all modifications and variations that fall within the scope of the claims.

What is claimed is:

1. A memory controller for migrating data chunks from a victim area in at least one memory die, among a plurality of memory dies, to a target area different from the victim area, the memory controller comprising:
   a buffer memory temporarily storing the data chunks read from the victim area;
   a target die information manager generating target die information on the plurality of memory dies, to which the data chunks are to be migrated respectively, according to logical address counts of the data chunks, the logical address counts being determined based on correspondence information between the plurality of memory dies and logical addresses corresponding to the data chunks; and
   a write operation controller controlling the plurality of memory dies so that the data chunks temporarily stored in the buffer memory are stored in the plurality of memory dies according to the target die information.

2. The memory controller of claim 1, wherein the target die information manager comprises:
   a correspondence information storage storing the correspondence information;
   an address counter generating the logical address counts corresponding to the data chunks to be migrated; and a target die information generator generating the target die information on the basis of the logical address counts.

3. The memory controller of claim 2, wherein the target die information generator generates candidate die information about the memory dies corresponding to the data chunks, respectively, on the basis of the correspondence information, and generates the target die information based on the logical address counts and the candidate die information.

4. The memory controller of claim 3, wherein the target die information manager uses the candidate die information as the target die information when a difference of logical address counts between any two of the plurality of memory dies is one or less.

5. The memory controller of claim 2, wherein the target die information manager generates the target die information to change a migration destination of one or more data chunks corresponding to the greatest logical address count from the first memory die to a second memory die.

6. The memory controller of claim 2, wherein the target die information manager generates the target die information to change a migration destination of one or more valid data chunks from a third memory die to a second memory die corresponding to the smallest logical address count.

7. The memory controller of claim 2, wherein the target die information manager generates the target die information to reduce a difference of logical address counts between any two of the plurality of memory dies to one or less when the difference exceeds one.

8. The memory controller of claim 1, wherein the correspondence information is indicative of sequential logical addresses corresponding to different memory dies among the plurality of memory dies.

9. The memory controller of claim 1, wherein the victim area is selected based on a number of valid data chunks stored in the victim area, a number of reads with respect to the victim area, or a number of erases with respect to the victim area.

10. The memory controller of claim 1, wherein the write operation controller controls the plurality of memory dies so that the data chunks are stored in the plurality of memory dies according to an interleaving scheme based on the target die information.

11. A storage device, comprising:
a plurality of memory dies;
a buffer memory temporarily storing a plurality of data chunks stored in a victim area in at least one memory die among the plurality of memory dies; and
a memory controller controlling the plurality of memory dies so that the plurality of data chunks are mapped to the plurality of memory dies to form a plurality of data chunk groups respectively corresponding to the plurality of memory dies, a data chunk included in at least one data chunk group is remapped to be included in another data chunk group on the basis of a number of data chunks included in each of the plurality of data chunk groups, and a set of data chunks, one selected from each of the plurality of data chunk groups, is stored in the plurality of memory dies.

12. The storage device of claim 11, wherein the memory controller remaps a data chunk included in a first data chunk group having the most data chunks to another data chunk group.

13. The storage device of claim 11, wherein the memory controller remaps a data chunk included in a second data chunk group including the fewest data chunks to another data chunk group other than the second data chunk group.

14. The storage device of claim 11, wherein the memory controller remaps the data chunks in at least one of the plurality of data chunk groups to the another data chunk group on the basis of the number of data chunks so that a difference in the numbers of data chunks between any two of the plurality of data chunk groups is one or less.

15. An operating method of a controller for controlling through a single channel a memory device including N memory dies, over which a plurality of stripes are formed, the operating method comprising:
relating data chunks, which are stored in a victim area within the memory device, to the N memory dies through a modulo N operation on logical addresses of the data chunks;
relating, when there are two or more incomplete sets of data chunks each incomplete set failing to configure a complete set of data chunks to be stored into a single one of the stripes, the individual data chunks within the incomplete sets to one or more of the N memory dies to configure a complete set of data chunks to be stored into the single stripe; and
controlling the memory device to migrate, according to an interleaving scheme, the data chunks from the victim area into the stripes based on the relating operation.

16. An operating method of a controller for controlling through a single channel a memory device including plural memory dies, the operating method comprising:
forming one or more stripes, each including plural pages respectively selected from the memory dies, the plural pages disposed at the same location within the respective memory dies; and
controlling the memory device to migrate data chunks from victim area into the stripes according to an interleaving scheme by collecting the data chunks from the victim area by a unit of a storage capacity of each of the stripes.

* * * * *